US012245135B2

(12) United States Patent
Sugaya et al.

(10) Patent No.: US 12,245,135 B2
(45) Date of Patent: Mar. 4, 2025

(54) COMMUNICATION DEVICE AND COMMUNICATION METHOD

(71) Applicant: SONY GROUP CORPORATION, Tokyo (JP)

(72) Inventors: Shigeru Sugaya, Tokyo (JP); Ren Sugai, Tokyo (JP); Yusuke Tanaka, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 486 days.

(21) Appl. No.: 17/417,953

(22) PCT Filed: Nov. 11, 2019

(86) PCT No.: PCT/JP2019/044073
§ 371 (c)(1),
(2) Date: Jun. 24, 2021

(87) PCT Pub. No.: WO2020/144932
PCT Pub. Date: Jul. 16, 2020

(65) Prior Publication Data
US 2022/0116858 A1 Apr. 14, 2022

(30) Foreign Application Priority Data
Jan. 8, 2019 (JP) .................. 2019-000984

(51) Int. Cl.
*H04W 48/16* (2009.01)
*H04W 48/08* (2009.01)
(Continued)

(52) U.S. Cl.
CPC ........... *H04W 48/16* (2013.01); *H04W 48/08* (2013.01); *H04W 68/005* (2013.01); *H04W 72/0453* (2013.01); *H04W 84/12* (2013.01)

(58) Field of Classification Search
CPC ................................. H04B 1/38; H04W 76/10
(Continued)

(56) References Cited

U.S. PATENT DOCUMENTS

2003/0129952 A1* 7/2003 Inoue .................... H03J 1/0075
340/905
2006/0056367 A1 3/2006 Marinier et al.
(Continued)

FOREIGN PATENT DOCUMENTS

CN 101019378 A 8/2007
CN 101141782 A 3/2008
(Continued)

OTHER PUBLICATIONS

International Search Report and Written Opinion of PCT Application No. PCT/JP2019/044073, issued on Feb. 4, 2020, 12 pages of ISRWO.

*Primary Examiner* — Kiet M Doan
(74) *Attorney, Agent, or Firm* — CHIP LAW GROUP

(57) ABSTRACT

A communication device and a communication method for allowing a communication terminal to be able to search for access points within a short time are provided. A communication device operating as an access point in a wireless network transmits a beacon signal at a predetermined beacon interval on an operation channel selected from available frequency channels. In addition, the communication device performs data transmission and data reception to/from a communication terminal subordinate thereto on the operation channel, and transmits a notification signal including information about the operation channel while switching channels at each predetermined cycle in available frequency channels other than the operation channel.

10 Claims, 28 Drawing Sheets

(51) Int. Cl.
*H04W 68/00* (2009.01)
*H04W 72/0453* (2023.01)
*H04W 84/12* (2009.01)

(58) Field of Classification Search
USPC .................................. 370/329, 281; 455/522
See application file for complete search history.

(56) References Cited

U.S. PATENT DOCUMENTS

| | | | |
|---|---|---|---|
| 2008/0062933 A1 | 3/2008 | Liu et al. | |
| 2008/0280621 A1 | 11/2008 | Soomro et al. | |
| 2009/0073043 A1* | 3/2009 | Nozaki | G01S 5/0081 |
| | | | 342/450 |
| 2011/0096679 A1* | 4/2011 | Hayashino | H04W 72/541 |
| | | | 370/252 |
| 2012/0026941 A1 | 2/2012 | Ahmad et al. | |
| 2013/0039323 A1* | 2/2013 | Ohnishi | H04W 74/0808 |
| | | | 370/329 |
| 2015/0024802 A1 | 1/2015 | Callard et al. | |
| 2015/0215935 A1* | 7/2015 | Taira | H04W 28/0236 |
| | | | 370/336 |
| 2018/0220417 A1 | 8/2018 | Matsuo | |

FOREIGN PATENT DOCUMENTS

| | | |
|---|---|---|
| CN | 101142788 A | 3/2008 |
| CN | 102742309 A | 10/2012 |
| CN | 104081853 A | 10/2014 |
| EP | 1790126 A1 | 5/2007 |
| EP | 1861957 A1 | 12/2007 |
| EP | 2540107 A1 | 1/2013 |
| EP | 2801232 A1 | 11/2014 |
| EP | 3355640 A1 | 8/2018 |
| JP | 2007-295031 A | 11/2007 |
| JP | 2008-079306 A | 4/2008 |
| JP | 2008-512953 A | 4/2008 |
| JP | 2008-533898 A | 8/2008 |
| JP | 2014-127831 A | 7/2014 |
| JP | 2014-233092 A | 12/2014 |
| JP | 2018-125622 A | 8/2018 |
| KR | 10-2006-0071296 A | 6/2006 |
| KR | 10-2007-0117586 A | 12/2007 |
| KR | 10-2012-0130753 A | 12/2012 |
| WO | 2006/031493 A2 | 3/2006 |
| WO | 2006/097874 A1 | 9/2006 |
| WO | 2011/106538 A1 | 9/2011 |
| WO | 2013/113277 A1 | 8/2013 |

* cited by examiner

| Dynamic Identifier Preamble | | | | | |
|---|---|---|---|---|---|
| L-STF | L-LTF | DI-SIG | | | |
| | | Operation Channel | F/R Order | CRC | Tail |

Fig. 12

| Preamble | | | Short Dynamic Identifier Preamble | | | |
|---|---|---|---|---|---|---|
| L-STF | L-LTF | L-SIG | Operation Channel | F/R Order | Available Channel Map | FCS |

Fig. 13

| Long Dynamic Identifier Preamble | | | | | | | | | |
|---|---|---|---|---|---|---|---|---|---|
| Frame Type | Duration Length | Broadcast Address | AP MAC Address | Operation Channel | Beacon Interval | F/R Order | Available Channel Map | Neighbor AP Channel Map | ... | FCS |

Fig. 14

| Element ID | Length | AP MAC Address | Operation Channel | Beacon Interval | F/R Order | AP Type | Available Channel Map | Neighbor AP Channel Map | ... | BSS Color | FCS |
|---|---|---|---|---|---|---|---|---|---|---|---|
| | | | | Dynamic Identifier Information Element | | | | | | | |

Fig. 18

| Available Channel Map | | | |
|---|---|---|---|
| 0 | 36 | 32 | N01 |
| 1 | 40 | 33 | N02 |
| 2 | 44 | 34 | N03 |
| 3 | 48 | 35 | N04 |
| 4 | 52 | 36 | N05 |
| 5 | 56 | 37 | N06 |
| 6 | 60 | 38 | N07 |
| 7 | 64 | 39 | N08 |
| 8 | 68 | 40 | N09 |
| 9 | 72 | 41 | N10 |
| 10 | 76 | 42 | N11 |
| 11 | 80 | 43 | N12 |
| 12 | 84 | 44 | N13 |
| 13 | 88 | 45 | N14 |
| 14 | 92 | 46 | N15 |
| 15 | 96 | 47 | N16 |
| 16 | 100 | 48 | N17 |
| 17 | 104 | 49 | N18 |
| 18 | 108 | 50 | N19 |
| 19 | 112 | 51 | N20 |
| 20 | 116 | 52 | N21 |
| 21 | 120 | 53 | N22 |
| 22 | 124 | 54 | N23 |
| 23 | 128 | 55 | N24 |
| 24 | 132 | 56 | N25 |
| 25 | 136 | 57 | N26 |
| 26 | 140 | 58 | N27 |
| 27 | 144 | 59 | N28 |
| 28 | 148 | 60 | N29 |
| 29 | 152 | 61 | N30 |
| 30 | 156 | 62 | N31 |
| 31 | 160 | 63 | N32 |

Fig. 19

| Available Channel Map | | | |
|---|---|---|---|
| 0 | N01 | 16 | N17 |
| 1 | N02 | 17 | N18 |
| 2 | N03 | 18 | N19 |
| 3 | N04 | 19 | N20 |
| 4 | N05 | 20 | N21 |
| 5 | N06 | 21 | N22 |
| 6 | N07 | 22 | N23 |
| 7 | N08 | 23 | N24 |
| 8 | N09 | 24 | N25 |
| 9 | N10 | 25 | N26 |
| 10 | N11 | 26 | N27 |
| 11 | N12 | 27 | N28 |
| 12 | N13 | 28 | N29 |
| 13 | N14 | 29 | N30 |
| 14 | N15 | 30 | N31 |
| 15 | N16 | 31 | N32 |

COMMUNICATION DEVICE AND COMMUNICATION METHOD

CROSS REFERENCE TO RELATED APPLICATIONS

This application is a U.S. National Phase of International Patent Application No. PCT/JP2019/044073 filed on Nov. 11, 2019, which claims priority benefit of Japanese Patent Application No. JP 2019-000984 filed in the Japan Patent Office on Jan. 8, 2019. Each of the above-referenced applications is hereby incorporated herein by reference in its entirety.

TECHNICAL FIELD

The technology disclosed in the present description relates to a communication device and a communication method for performing wireless communication.

BACKGROUND ART

In a wireless local area network (LAN) system, a technology by which access points select channels to be used and a communication terminal scans all channels to search for access points present adjacent thereto is used. In addition, the communication terminal can transmit a probe request to access points without performing channel scanning and receive a probe response from an access point operating in a corresponding channel to obtain information about a network.

With the recent explosive spread of wireless LAN systems, frequency channel resources are running out due to an environment in which uncountable access points are adjacently present. Although use of new frequency bands in wireless LAN systems is conceivable, operation would be performed while existing systems were already operating as a primary operation, and thus there is concern of interference with neighboring systems when a communication terminal freely transmits radio waves.

In addition, a technology for allowing a specific frequency channel to be used only for exchange of control signals and using an additional frequency channel for data transmission is also conceivable. In this case, a communication terminal can receive signals from neighboring access points if it simply receives the channel for control signals.

For example, a method of transmitting, by an access point, a discovery beacon at a beacon interval shorter than that of a general beacon has been proposed (refer to PTL 1).

In addition, a communication control method in which a probe request and a response are exchanged between a communication terminal and an access point using a first channel, and the communication terminal changes the first channel to a second channel indicated by channel information of a second frequency band extracted from the probe response and connects to the access point has been proposed (refer to PTL 2).

CITATION LIST

Patent Literature

[PTL 1] JP 2014-233092 A
[PTL 2] JP 2014-127831 A

SUMMARY

Technical Problem

An object of a technology disclosed in the present description is to provide a communication device and a communication method capable of efficiently searching for access points.

Solution to Problem

A first aspect of a technology disclosed in the present description is a communication device including:
a communication unit configured to transmit/receive a radio signal using available frequency channels; and
a control unit configured to control radio signal transmission/reception operations of the communication unit,
wherein the control unit controls data transmission and data reception operations in an operation channel selected from the available frequency channels, and an operation of switching channels at a predetermined cycle to sequentially transmitting a notification signal including information about the operation channel in the available frequency channels other than the operation channel.

The communication device according to the first aspect transmits a beacon signal at a predetermined beacon interval on the operation channel, operates as an access point, and causes the notification signal to be transmitted at the same cycle as the beacon interval in the available frequency channels other than the operation channel. In addition, the communication device according to the first aspect causes the notification signal further including at least one of information about the available frequencies, information about the beacon interval, a direction in which channels through which the notification signal is transmitted are switched, and information about a neighboring access point to be transmitted.

In addition, a second aspect of the technology disclosed in the present description is a communication method including:
a data communication step of transmitting/receiving a data frame in an operation channel selected from available frequency channels; and
a notification step of switching channels at a predetermined cycle and sequentially transmitting a notification signal including information about the operation channel in the available frequency channels other than the operation channel.

In addition, a third aspect of the technology disclosed in the present description is a communication device including:
a communication unit configured to transmit/receive a radio signal using available frequency channels; and
a control unit configured to control radio signal transmission/reception operations of the communication unit,
wherein the control unit selects at least one scan channel from the available frequencies, causes a reception operation to be performed over a predetermined cycle, and acquires information about an operation channel of another communication device that is a transmission source from a notification signal received through the scan channel.

The communication device according to the third aspect searches for access points of a wireless network on the basis of the notification signal received through the scan channel. Further, the communication device according to the third aspect may cause communication with the other communication device operating as an access point to be performed to acquire information of the access point in the operation channel identified on the basis of the received notification signal. In addition, the communication device according to the third aspect moves to a desired access point and operates as a communication terminal in the wireless network.

In addition, a fourth aspect of the technology disclosed in the present description is a communication method including:

a step of selecting at least one scan channel from available frequencies and performing a reception operation over a predetermined cycle;

a step of acquiring information about an operation channel of a communication device that is a transmission source from a notification signal received through the scan channel; and a step of performing transmission or reception of a data frame in the operation channel.

Advantageous Effects of Invention

According to the technology disclosed in the present description, it is possible to provide a communication device and a communication method for allowing a communication terminal to be able to search for an access point within a short time.

In addition, according to the technology disclosed in the present description, it is possible to provide a communication device and a communication method capable of avoiding collision and performing stable data transmission.

The effects described in the present description are merely illustrative and effects of the present invention are not limited thereto. In addition, the present invention may further obtain additional effects in addition to the aforementioned effects.

Other objects, features, and advantages of the technology disclosed in the present description will become clear according to detailed description based on embodiments which will be described later and the attached drawings.

BRIEF DESCRIPTION OF DRAWINGS

FIG. 12 is a diagram showing an example of a configuration of a notification signal configured as a short frame.

FIG. 13 is a diagram showing an example of a configuration of a notification signal configured as a long frame.

FIG. 14 is a diagram showing an example of a configuration of a notification signal configured as an information element.

FIG. 18 is a diagram showing an example of information entry in an available channel map (in the case of using a 5 GHz band and a 6 GHz band).

FIG. 19 is a diagram showing an example of information entry in an available channel map (in the case of using a 6 GHz band).

DESCRIPTION OF EMBODIMENTS

Figure 1:
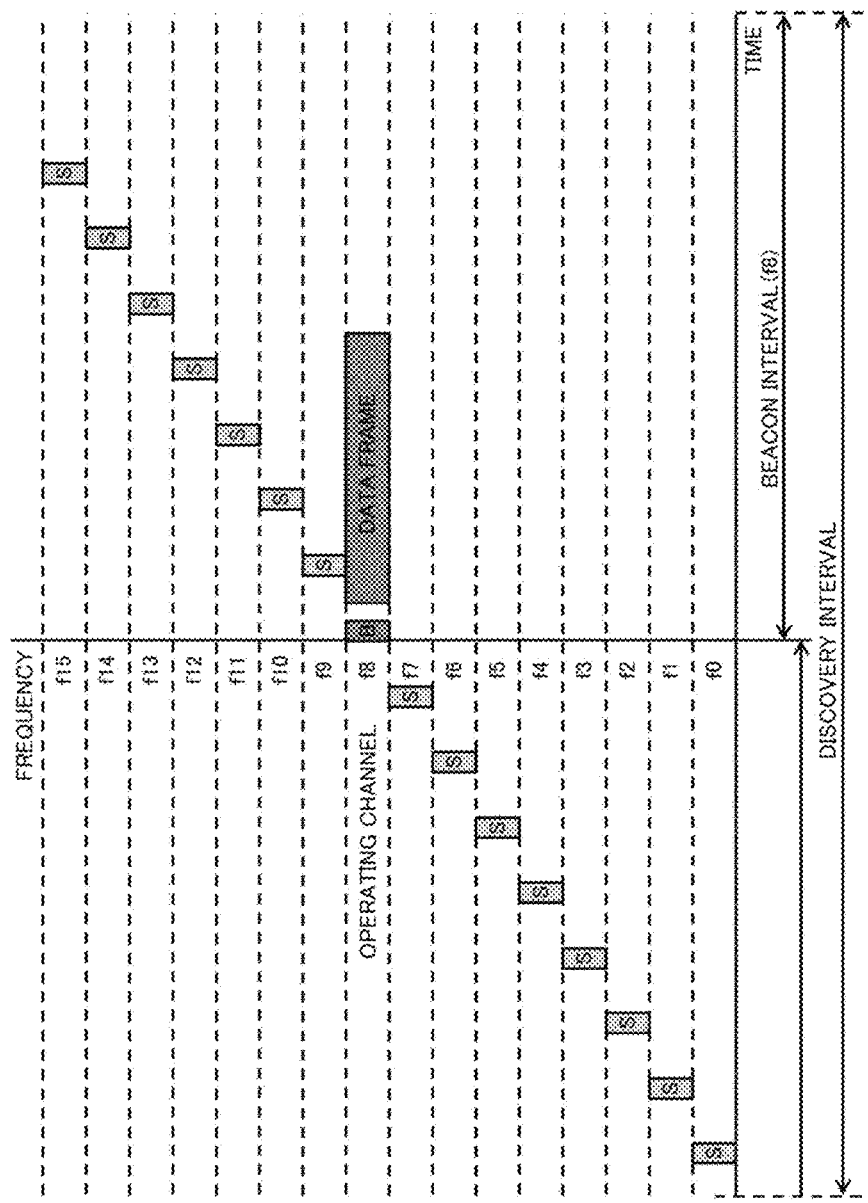
FIG. 1 is a diagram showing an operation channel of an access point and a transmission structure of a notification signal.

Hereinafter, embodiments of a technology described in the present description will be described in detail with reference to the drawings.

In a wireless LAN system, a technology by which access points select channels to be used and a communication terminal scans all channels to search for access points present adjacent thereto is used (which has been described above). Accordingly, when the number of channels to be scanned is large, the time required for the communication terminal to search for access points may be long.

In addition, in a case where a new frequency band becomes available in a wireless LAN system and thus frequency channels thereof are extended, when a communication terminal performs channel scanning for continuously receiving channels, the communication terminal needs to search the entire range of the extended frequency channels and thus there is a concern about increase in a time required for the search.

Furthermore, when a wireless LAN system has been approved to share a frequency band already operating in a primary operation system, a communication terminal also needs to ascertain whether the frequency band can be used in advance by accessing a predetermined database or the like. When signal transmission from the communication terminal is limited such that it does not interfere with the primary operation communication system, there is a problem that the communication terminal cannot search for access points at an arbitrary timing because the communication terminal cannot transmit a probe request.

In addition, a method of using a specific frequency channel only for exchange of control information has a problem that data transmission over the channel cannot be performed. For example, when one of eight channels is allocated as a channel for control information exchange, a throughput decreases by 12.5%.

Furthermore, when beacon information is segmented and beacon segments are simultaneously transmitted through a plurality of channels (a discovery beacon is set to one of the beacon segments) (refer to PTL 1), a communication terminal needs to scan the channels while switching the channels to discover the discovery beacon.

In the technology disclosed in PTL 1, a beacon device sequentially broadcasts beacons in an available spectrum according to pseudo-random method. That is, when a discovery beacon moves to another channel that can be randomly selected and thus a beacon symbol is not received in that channel after the elapse of given time, a scanning device needs to move to the next available channel and receive the discovery beacon.

Further, in the technology disclosed in PTL 1, there are cases in which a discovery beacon is permitted to be transmitted according to a frequency hopping method and thus the discovery beacon moves to a vacant channel each time it is transmitted. Since the discovery beacon is not necessarily periodically transmitted at the same frequency, a next timing at which the discovery beacon is transmitted in a specific frequency channel cannot be ascertained. Accordingly, a receiving side cannot determine a vacant channel in which the discovery beacon will be transmitted even when the discovery beacon is transmitted at a beacon interval shorter than a general beacon interval and, as a result, there is a problem that it is necessary to wait for the discovery beacon over a time longer than the general beacon interval.

In addition, in a method of exchanging a probe request and a response between a communication terminal and an access point using a first channel (refer to PTL 2), the communication terminal needs to transmit a signal on the first channel in order to collect information on a second channel used for data transmission.

Accordingly, the present description proposes a wireless network management method capable of reducing a channel scanning time of a communication terminal below. Specifically, the present description proposes a method in which a communication device serving as an access point transmits a short notification signal by sequentially switching available frequency channels, and a communication device serving as a communication terminal ascertains the presence of an access point present around by collecting the notification signal through few frequency channels.

In addition, the present description also proposes a network management method for avoiding exact coincidence of timings of notification signals by selecting either of an ascending order and a descending order of a sequence pattern of sequentially switching frequency channels in a frequency direction.

An access point additionally sets an operation channel used for normal data communication, includes information capable of identifying the operation channel in a short notification signal, and transmits the notification signal. Then, a communication terminal moving to the access point performs processing of entering a network on the basis of the operation channel. The communication terminal can receive a beacon signal from the access point on the operation channel and transmit a probe request to the access point to acquire information necessary to enter the network.

Further, by collecting notification signals received by the communication terminal through the operation channel and exchanging information between the communication terminal and the access point, control of avoiding data transmission at a timing of a notification signal at a data reception destination or inserting a null MPDU into aggregated frames (A-MPDU) as a saved interval in which a data part is not present to construct data reception is executed to perform transmission such that data does not include an error.

Alternatively, when data transmission is performed through the operation channel at a timing at which a communication device operating as an access point transmits a notification signal through another frequency channel, a null MPDU may be inserted as a buffering interval in which a data part is not present at the notification signal transmission timing to construct data.

Figure 26:
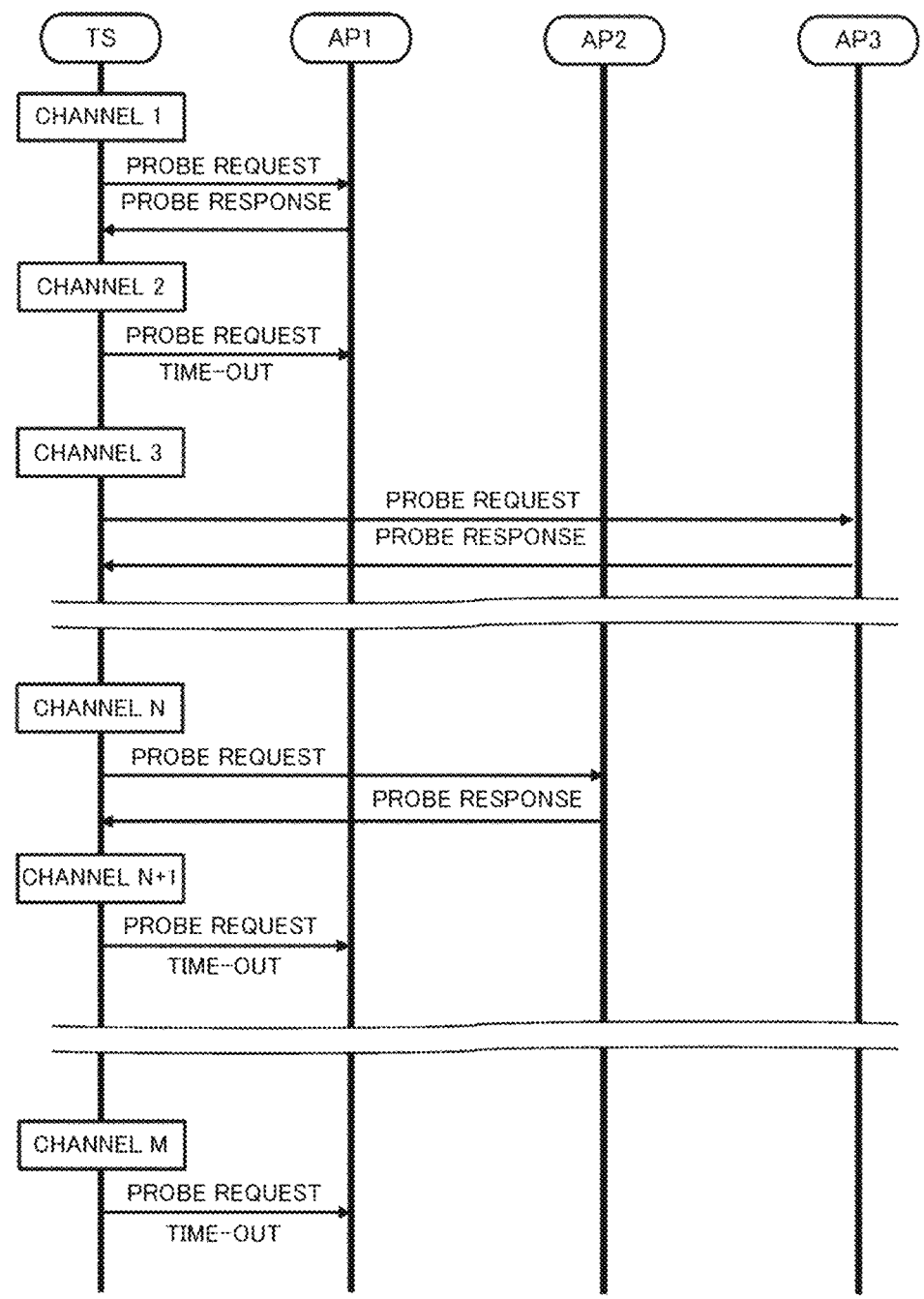
FIG. 26 is a diagram showing an example of a communication sequence through which a communication terminal searches for access points.

FIG. 26 shows an example of a communication sequence through which a communication terminal searches for access points. In the illustrated communication sequence in accordance with the details described in the IEEE 802.11 specification which is one wireless LAN communication standards, a procedure through which a communication terminal transmits a probe request frame and receives probe response frames from access points to obtain parameters of the access points is performed. Further, in the figure, an operation of a single communication terminal (TS) to obtain information of each access point in an environment in which three access points AP1 to AP3 are present is assumed.

The communication terminal may set a frequency channel to channel 1 first and obtain parameters of an access point AP1 by transmitting a probe request frame and receiving a probe response frame from the access point AP1.

Then, the communication terminal sets a frequency channel to channel 2 and transmits a probe request frame but cannot newly obtain parameters of an access point because time-out occurs without being able to receive a probe response frame from any of the access points.

Then, the communication terminal may set a frequency channel to channel 3 and obtain parameters of an access point AP3 by transmitting a probe request frame and receiving a probe response frame from the access point AP3.

Thereafter, the communication terminal may set a frequency channel to channel N and obtain parameters of an access point AP2 by transmitting a probe request frame and receiving a probe response frame from the access point AP2.

Then, the communication terminal sets a frequency channel to channel N+1 and transmits a probe request frame but cannot newly obtain parameters of an access point because time-out occurs without being able to receive a probe response frame from any access point.

Thereafter, the communication terminal sets a frequency channel to channel M and transmits a probe request frame but cannot newly obtain parameters of an access point because time-out occurs without being able to receive a probe response frame from any access point.

According to the communication sequence shown in FIG. 26, the communication terminal can successively ascertain the presence of neighboring access points by receiving a probe response frame from access points in each available frequency channel.

However, when the number of available frequency channels increases, the communication terminal needs to exchange a probe request with a probe response in all frequency channels because the communication terminal cannot determine a frequency channel in which an access point is operating. Accordingly, a long time is required for the communication terminal to search for neighboring access points.

Otherwise, in a frequency band newly permitted to be used, a communication terminal also needs to access a predetermined database or the like to ascertain whether it is possible to use the frequency band in advance because the communication terminal shares a frequency band already operating by a primary operation system. On the other hand, when a frequency channel that is not permitted for transmission from the communication terminal is set as an operation channel, the probe request cannot be initially transmitted.

Figure 27:
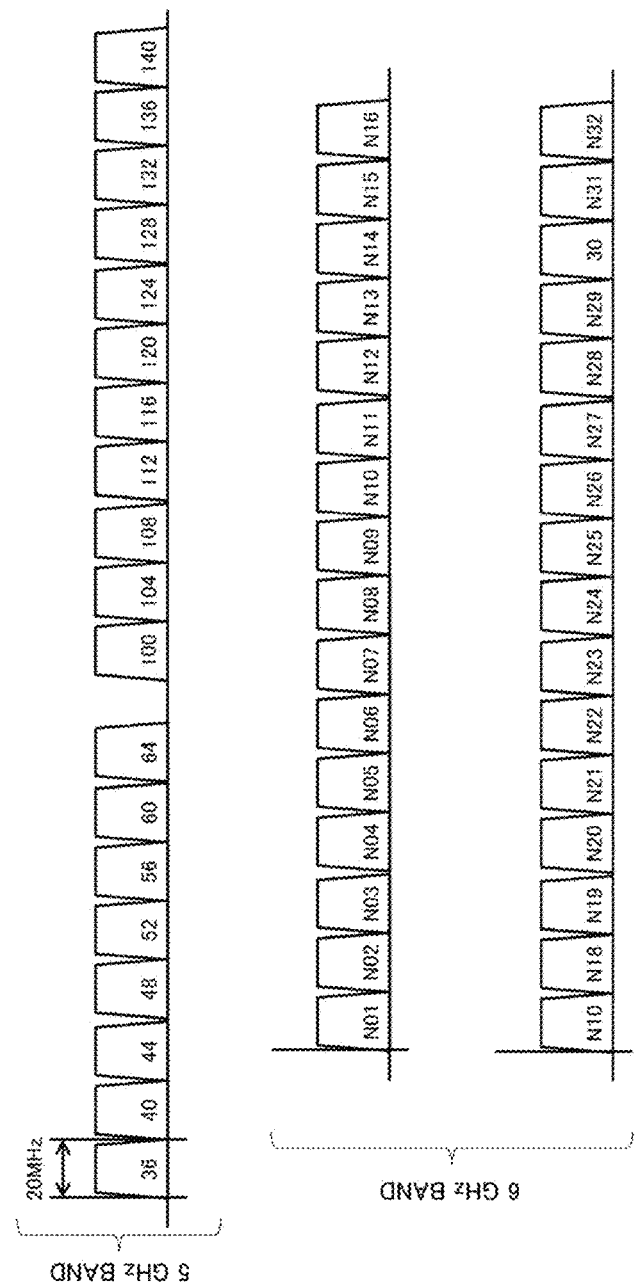
FIG. 27 is a diagram showing an example of an arrangement of frequency channels available in a wireless LAN system.

FIG. 27 shows an example of an arrangement of frequency channels available in a wireless LAN system. In the figure, an example in which predetermined frequency bands with a frequency bandwidth of 20 MHz can be used is shown as a case of using a 5 GHz band.

In a low frequency band, 8 channels having channel numbers 36, 40, 44, 48, 52, 56, 60, and 64 are available in succession. In addition, in a high frequency band, 11 channels having channel numbers 100, 104, 108, 112, 116, 120, 124, 128, 132, 136, and 140 are available in succession. Accordingly, a total of 19 channels are available.

Further, a case of using a 6 GHz band as a new frequency band may be conceived. Although FIG. 27 schematically shows a state in which at least 32 channels are available in succession, the present description is not limited thereto and a number of available channels greater than or less than this range may be set. Here, it is also assumed that a frequency bandwidth is 20 MHz and channel numbers N01 to N32 are set in succession. In this case, a communication terminal that attempts to enter a network also needs to scan the 32 frequency channels of the 6 GHz band in addition to the 19 frequency channels of the 5 GHz band, and thus the time required to search for the access points can be expected to increase.

Figure 28:
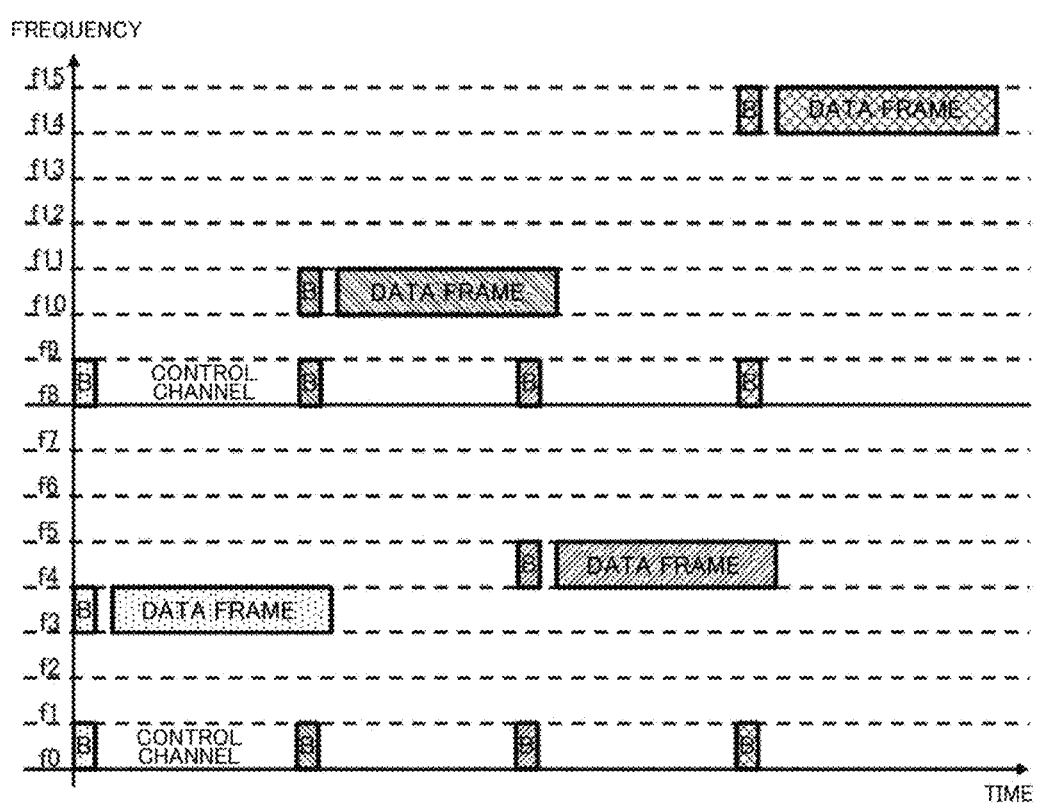
FIG. 28 is a diagram showing a procedure for setting a common control channel and notifying an operation channel.

FIG. 28 illustrates a procedure of setting one of available frequency channels to a common control channel and notifying, by first to fourth access points, the respective operation channels. In the figure, a vertical axis represents a frequency channel and a horizontal axis is a time axis. Here, 16 frequency channels f0 to f15 are present as available frequency channels. In addition, a quadrangle drawn on each horizontal axis represents a signal transmitted on the corresponding frequency channel. A quadrangle denoted by "B" is a beacon. Further, a quadrangle indicating a signal transmitted by a first access point is represented by a dot pattern, a quadrangle indicating a signal transmitted by a second access point is represented by being shaded with oblique lines downward to the right, a quadrangle indicating a signal transmitted by a third access point is represented by being shaded with oblique lines upward to the right, and a quadrangle indicating a signal transmitted by a fourth access point is represented by a lattice pattern.

Here, the frequency channels f0 and f8 are set as control channels, and the first to fourth access points set frequency channels other than f0 and f8 to operation channels. Each access point transmits a beacon signal including information about each operation channel through at least one of the control channels f0 and f8 and also transmits the beacon signal through each operation channel.

The first access point sets the frequency channel f3 as an operation channel. The first access point transmits a beacon through the control channels f0 and f8 and the operation channel f3 at a predetermined timing. Further, the first access point transmits a data frame on the operation channel f3 thereof.

The second access point sets the frequency channel f10 as an operation channel. The second access point transmits a beacon signal through the control channels f0 and f8 and the operation channel f10 at the next timing. Further, the second access point transmits a data frame on the operation channel f10 thereof.

The third access point sets the frequency channel f4 as an operation channel. The third access point transmits a beacon through the control channels f0 and f8 and the operation channel f4 at the timing after the next timing. Further, the third access point transmits a data frame on the operation channel f4 thereof.

The fourth access point sets the frequency channel f14 as an operation channel. The third access point transmits a beacon through the control channels f0 and f8 and the operation channel f14 at the timing after the next timing. Further, the fourth access point transmits a data frame on the operation channel f14 thereof.

In this manner, the first to fourth access points transmit beacons in the control channels f0 and f8 along with beacons of the respective operation channels, and thus a communication terminal that attempts to enter the network can collect information on the first to fourth access points without omission by consecutively receiving the control channels f0 and f8 without channel scanning.

However, one control channel is set, for example, for every 8 channels, in other words, 12.5% of all available channels are set to control channels which cannot be used as data transmission channels, resulting in deterioration of throughput.

Figure 29:
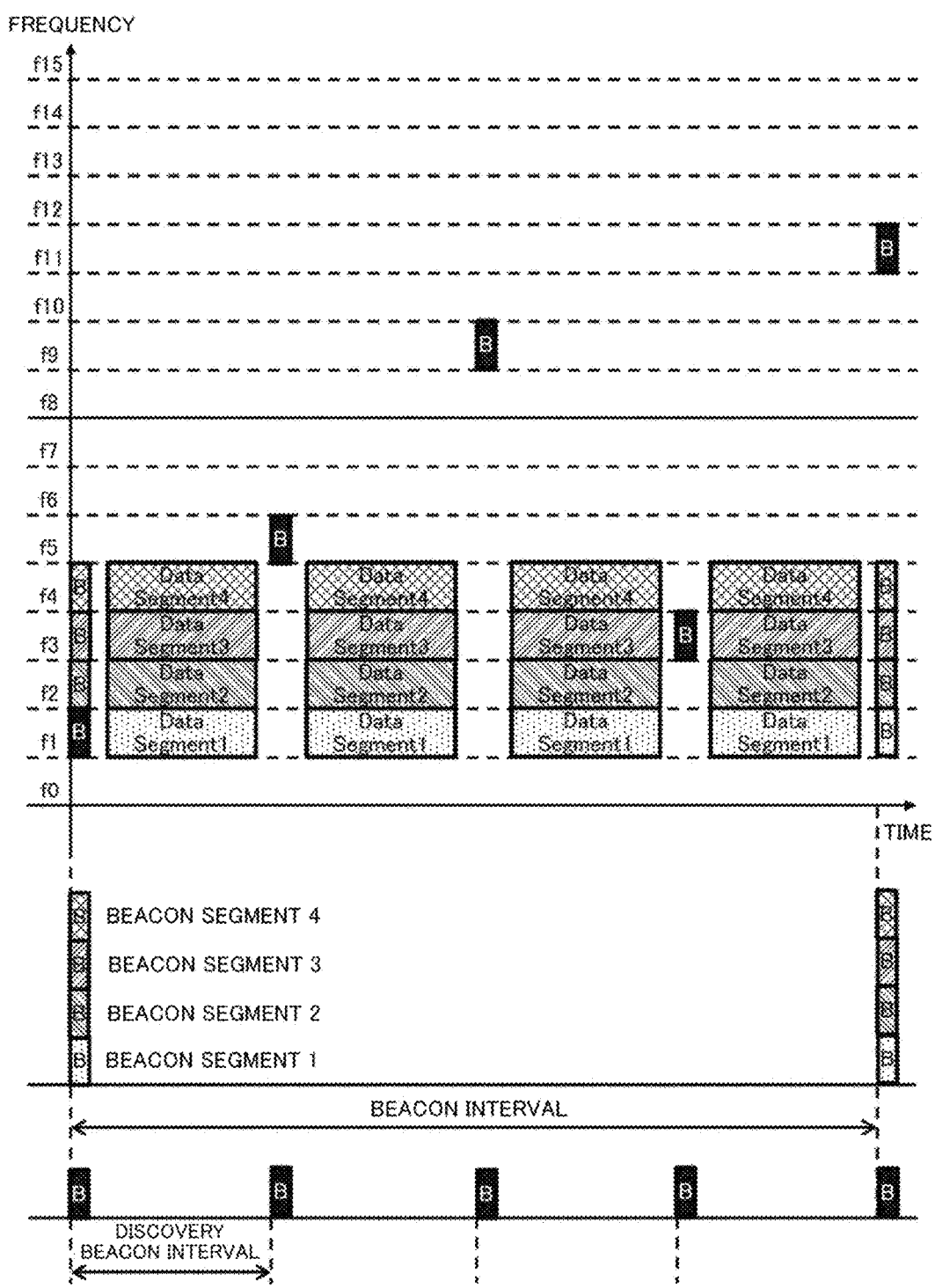
FIG. 29 is a diagram showing an example of a communication sequence of transmitting a discovery beacon through frequency hopping.

FIG. 29 shows an example of a communication sequence through which a discovery beacon is transmitted according to frequency hopping. In the figure, it is assumed that one piece of beacon information is segmented into a plurality of beacon segments and the beacon segments are simultaneously transmitted through a plurality of channels (a discovery beacon is assumed to be one beacon segment). In the figure, a horizontal axis is assumed to be a time axis and a vertical axis is assumed to be a frequency axis. Here, 16 frequency channels f0 to f15 are present as available frequency channels. In addition, a quadrangle indicated on each horizontal axis represents a signal transmitted on the corresponding frequency channel. A quadrangle denoted by "B" is a beacon.

For example, an access point sets the frequency channels f1 to f4 as operation channels. Then, the access point configures a beacon frame as 4 segments, sets a predetermined beacon interval, and transmits the beacon segments at the beacon interval. That is, beacon segment 1 is transmitted through the channel f1, beacon segment 2 is transmitted through the channel f2, beacon segment 3 is transmitted through the channel f3, and beacon segment 4 is transmitted through the channel f4 periodically at the predetermined beacon interval.

Then, data segments are set subsequently to the beacon segments and data transmission is performed. Data segment 1 is transmitted through the channel f1, data segment 2 is transmitted through the channel f2, data segment 3 is transmitted through the channel f3, and data segment 4 is transmitted through the channel f4.

Meanwhile, a quadrangle indicating a signal transmitted through the channel f1 is represented by a dot pattern, a quadrangle indicating a signal transmitted through the channel f2 is represented by being shaded with oblique lines downward to the right, a quadrangle indicating a signal transmitted through the channel f3 is represented by being shaded with oblique lines upward to the right, and a quadrangle indicating a signal transmitted through the channel f4 is represented by a lattice pattern in FIG. 29.

Further, a discovery beacon is transmitted according to hopping through random frequency channels at a discovery beacon interval shorter than the beacon interval. Since the discovery beacon is transmitted using the beacon segments, the discovery beacon is initially transmitted through the channel f1, subsequently transmitted in the channel f5 at a timing of a control segment shorter than the beacon interval, subsequently transmitted in the channel f9 at the next timing, subsequently transmitted in the channel f3 at the next timing, and subsequently transmitted in the channel f11 at a timing of the beacon interval. In FIG. 29, a quadrangle indicating the discovery beacon is represented in black, and "B" indicating the beacon signal is represented as a white character.

However, since the discovery beacon is transmitted by performing frequency hopping, there is a problem that the discovery beacon cannot be easily discovered when the discovery beacon interval shorter than the beacon interval is set and channel scanning is performed.

FIG. 1 shows an operation channel of an access point and a transmission structure of a notification signal based on a network management method proposed in the present description. In the figure, a vertical axis represents a frequency channel and a horizontal axis is a time axis. Here, 16 frequency channels f0 to f15 are present as available frequency channels. In addition, a quadrangle indicated on each horizontal axis represents a signal transmitted on the corresponding frequency channel. A quadrangle indicated by "B" is a beacon, and a quadrangle indicated by "S" is a notification signal. The notification signal is a short signal including information capable of identifying an operation channel of an access point, which will be described in detail later.

The access point sets the frequency channel f8 as an operation channel and sets a predetermined beacon interval. Further, the access point transmits the notification signal (S) at a shifted timing in each channel at the same cycle as the beacon interval over the channels f9 to f15 and f0 to f7 different from the operation channel.

That is, the access point transmits the beacon (B) through the operation channel that is the frequency channel f8 at beacon intervals. In addition, the access point sequentially switches channels in ascending order in the frequency direction and sequentially transmits the notification signal (S) through available frequency channels f0 to f7 and f9 to f15 other than the operation channel f8 at timings obtained by equally dividing the beacon interval by 16 that is the number of available channels. Upon transmission of the notification signal (S) through the frequency channel f9 at the next timing obtained by equally dividing the beacon interval by 16, the access point transmits the notification signal (S) through the frequency f10 at the timing after the next timing. Then, after transmission of the notification signal (S) through the frequency channel f15, the access point changes frequency channels to return to the frequency channel f0 and transmits the notification signal (S) through the frequency channel f0 near the center of the beacon interval. Further, the access point transmits the notification signal (S) through the frequency channel f7 immediately before the next beacon transmission timing and transmits the beacon (B) through the operation channel f8 upon the arrival of the beacon transmission timing.

A communication terminal can receive the beacon (B) or receive the notification signal (S) to identify the operation channel of this access point by performing a scanning operation over a discovery interval having the same duration as the beacon interval in any one of the available frequency channels f0 to f15. Accordingly, the communication terminal can connect to this access point and enter the network more efficiently than in a case of scanning all available frequency channels.

Meanwhile, although illustration is omitted, the access point may sequentially switch channels in a descending order instead of an ascending order in the frequency direction and sequentially transmit the notification signal (S) at timings obtained by equally dividing the beacon interval by the number of available frequency channels.

Figure 2:
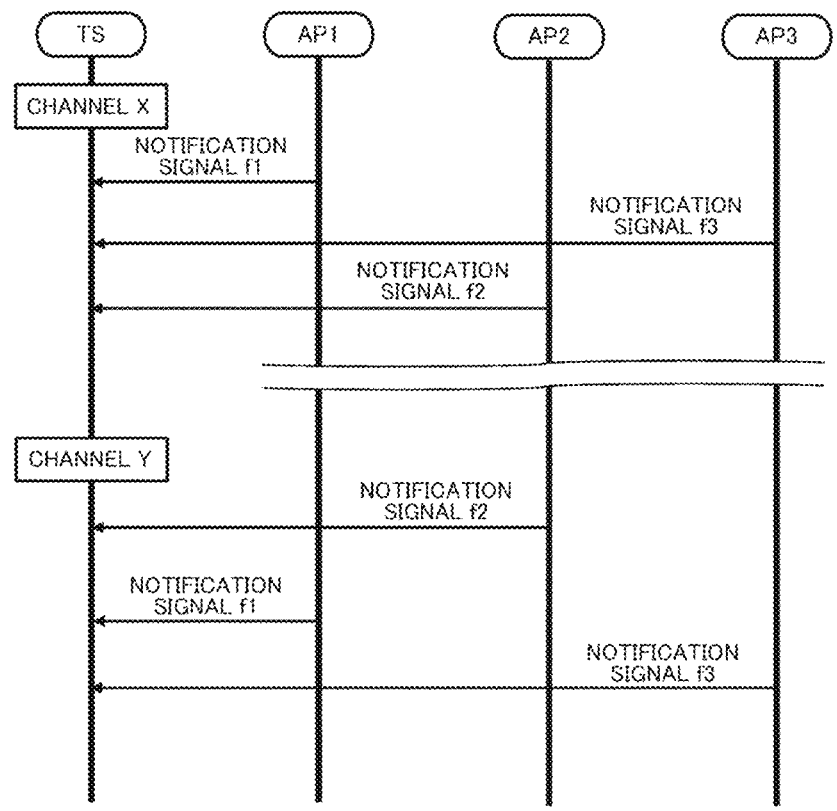
FIG. 2 is a diagram showing an example of a communication sequence through which a communication terminal searches for access points.

FIG. 2 shows an example of a communication sequence through which a communication terminal searches for access points on the basis of the network management method proposed in the present description. In the figure, it is assumed that a single communication terminal (TS) performs an operation of obtaining information on each access point in an environment in which 3 access points AP1 to AP3 are present. Here, it is assumed that each of the access points AP1 to AP3 sequentially switches channels in ascending order in the frequency direction and sequentially transmits the notification signal (S) at timings obtained by equally dividing the beacon interval.

First, the communication terminal receives the notification signal from the access point AP1 at a first timing, receives the notification signal from the access point AP3 at a second timing, and receives the notification signal from the access point AP2 at a third timing in a channel X.

These notification signals include information capable of identifying operation channels of the access points that are transmission sources. Accordingly, the communication terminal can ascertain an operation channel f1 of the access point AP1, an operation channel f2 of the access point AP2, and an operation channel f3 of the access point AP3 on the basis of the information acquired from the respective notification signals. Then, the communication terminal can identify a timing at which a beacon is transmitted in the channel X and switches frequencies to the operation channel f1, f2, or f3 of each access point AP1, AP2, or AP3 to receive the beacon as necessary.

In addition, the communication terminal may switch frequencies to a channel Y different from the channel X and re-collect notification signals in order to re-check presence or absence of uncollected notification signals. In FIG. 2, the communication terminal sequentially switches to the channel Y, receives the notification signal from the access point AP2 at the first timing, receives the notification signal from the access point AP1 at the second timing, and receives the notification signal from the access point AP3 at the third timing.

Accordingly, the communication terminal can ascertain the operation channels f1, f2, and f3 and beacon transmission timings of the access points AP1, AP2, and AP3 operating in different operation channels from the notification signals received through the channel X and the channel Y.

In the IEEE 802.11 specification, a procedure through which a communication terminal transmits a probe request frame and receives a probe response frame from an access point to obtain parameters of the access point is defined. On the other hand, in the communication sequence shown in FIG. 2, the communication terminal can collect the notification signals (S) having a short data length transmitted from the access points by consecutively receiving arbitrary frequency channels over a predetermined beacon interval.

In comparison of the communication sequence shown in FIG. 2 with the communication sequence shown in FIG. 26, the communication terminal can ascertain the presence of neighboring access points AP1 to AP3 in both cases. However, the communication terminal can search for neighboring access points within a shorter time by receiving notification signals from the neighboring access points with a smaller number of times of frequency switching in the former case.

Figure 3:
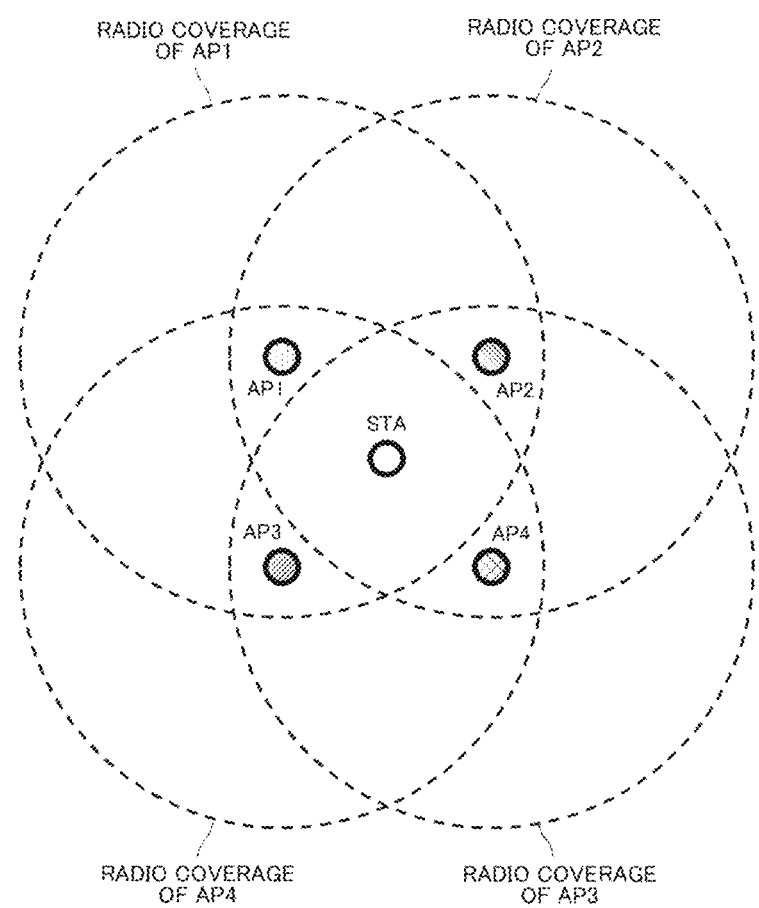
FIG. 3 is a diagram showing an example of an arrangement of access points and a communication terminal in a wireless network.

FIG. 3 shows an example of an arrangement of access points and a communication terminal in a wireless network. Although the figure schematically shows spatial positions at which 4 access points AP1 to AP4 are disposed, the access points AP1 to AP4 are present at positions at which they can communicate with each other. Circles drawn in broken lines schematically represent radio coverages of access points at the centers of the circles.

When the access points AP1 to AP4 are disposed in the state as shown in FIG. 3, the access points can operate in cooperation because intercommunication between access points can be performed. In addition, a communication terminal (STA) is present at a position at which it can receive signals from the access points AP1 to AP4. Accordingly, the communication terminal can connect to any of the access points AP1 to AP4 to enter the network.

Figure 4:
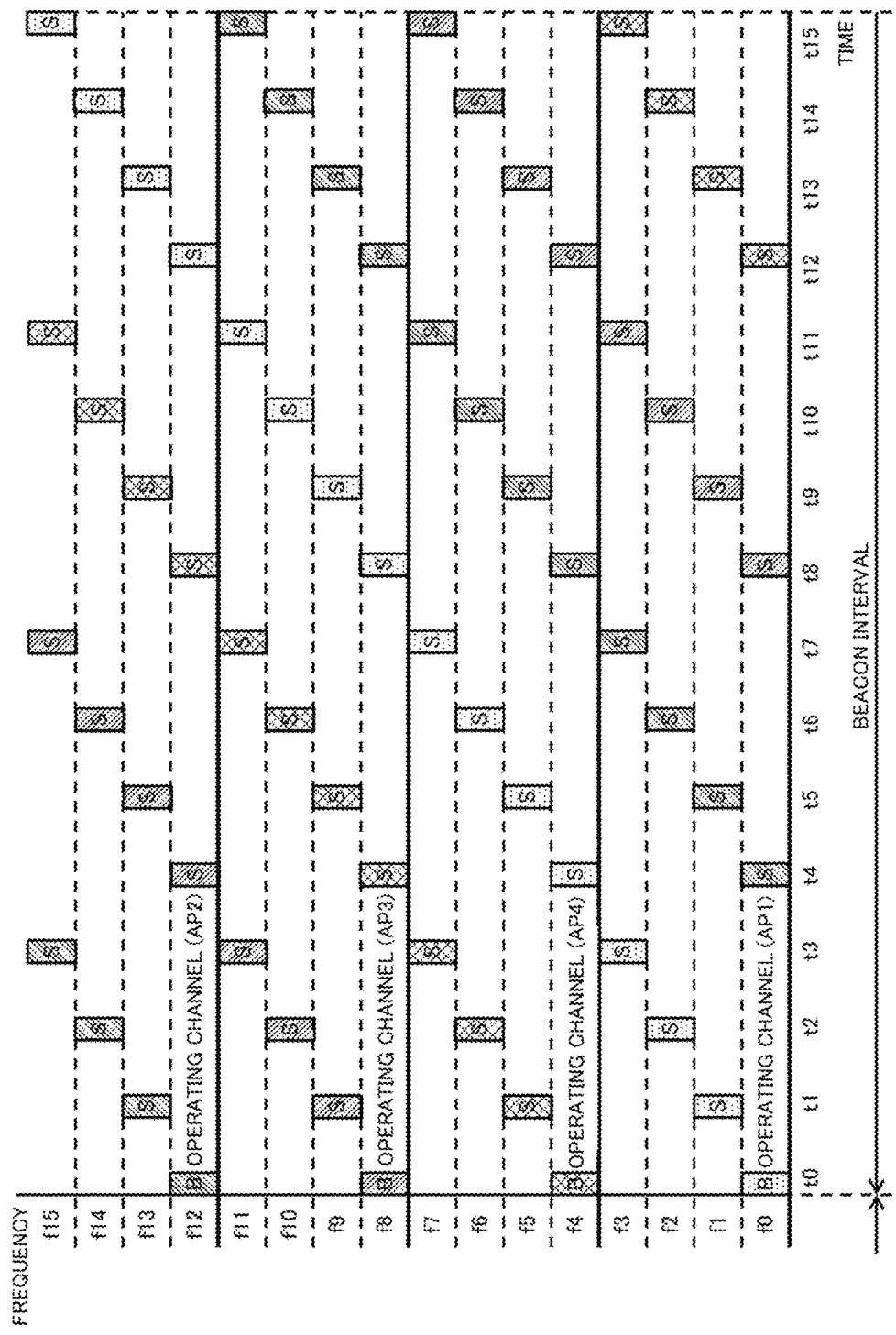
FIG. 4 is a diagram showing a state in which access points are operating in cooperation.

FIG. 4 shows a state in which the access points AP1 to AP4 operate in cooperation on the basis of the network management method proposed in the present description. In the figure, a vertical axis represents a frequency channel and a horizontal axis is a time axis. Here, it is assumed that 16 frequency channels f0 to f15 are present as available frequency channels. In addition, a quadrangle indicated on each horizontal axis represents a signal transmitted on the corresponding frequency channel. A quadrangle indicated by "B" is a beacon, and a quadrangle indicated by "S" is a notification signal. In addition, a signal transmitted by the access point AP1 is represented by a dot pattern, a signal transmitted by the access point AP2 is represented by being shaded with oblique lines downward to the right, a signal transmitted by the access point AP3 is represented by being shaded with oblique lines upward to the right, and a signal transmitted by the access point AP4 is represented by a lattice pattern.

The access points AP1 to AP4 are disposed in a state in which they can perform intercommunication therebetween, as shown in FIG. 3, and operate in cooperation. That is, all the access points AP1 to AP4 set a predetermined beacon interval and operate in synchronization. Among them, the access point AP1 sets a channel f0 as an operation channel, the access point AP2 sets a channel f12 as an operation channel, the access point AP3 sets a channel f8 as an operation channel, and the access point AP4 sets a channel f4 as an operation channel, and they transmit predetermined beacons (B) at a timing t0.

Further, at a timing t1, the access point AP1 transmits the notification signal (S) through the channel f1, the access point AP4 transmits the notification signal (S) through the channel f5, the access point AP3 transmits the notification signal (S) through the channel f9, and the access point AP2 transmits the notification signal (S) through the channel f13.

Thereafter, at a timing t2, the access point AP1 transmits the notification signal (S) through the channel f2, the access point AP4 transmits the notification signal (S) through the channel f6, the access point AP3 transmits the notification signal (S) through the channel f10, and the access point AP2 transmits the notification signal (S) through the channel f14. That is, the access points AP1 to AP4 unify sequence patterns in ascending order and periodically transmit the notification signals while sequentially switching frequency channels to avoid collision of the notification signals thereof.

In this manner, the access points AP1 to AP4 sequentially switch channels in ascending order in the frequency direction and sequentially transmit the notification signal (S) through available frequency channels other than the operation channels thereof at timings obtained by equally dividing the beacon interval by 16 that is the number of available channels. Then, the access points AP1 to AP4 perform intercommunication, operate in cooperation, set different frequency channels as operation channels such that the operation channels do not overlap, and unify the beacon transmission timing and the beacon interval. In addition, the access points AP1 to AP4 unify sequence patterns in which frequency channels are sequentially switched as ascending order in the frequency direction to avoid coincidence of transmission timings of the notification signals (S) on the same frequency channel. Further, the access points AP1 to AP4 unify the beacon interval such that the notification signals of the access points AP1 to AP4 are periodically transmitted in arbitrary frequency channels.

Figure 5:
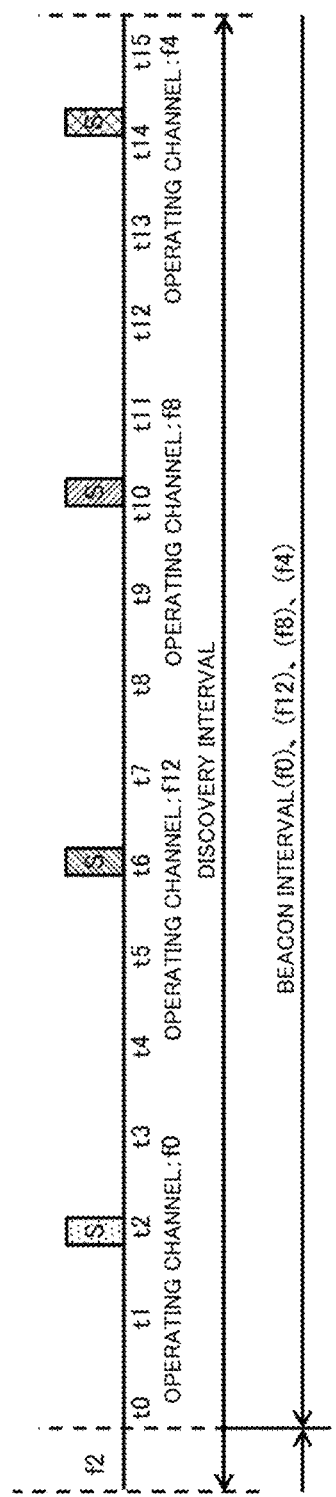
FIG. 5 is a diagram illustrating an operation of a communication terminal searching for neighboring access points.

FIG. 5 illustrates an operation of a communication terminal to search for access points. Here, it is assumed that the access points AP1 to AP4 operate in cooperation to transmit beacon signals through the operation channels thereof and sequentially transmit the notification signals (S) through available frequency channels other than the operation channels according to FIG. 4. In addition, FIG. 5 shows a state in which the communication terminal performs reception in the frequency channel f2 over a predetermined beacon interval.

The communication terminal performs reception over a predetermined discovery interval in the frequency channel f2. Then, the communication terminal receives the notification signal (S) of the access point AP1 at a timing t2, receives the notification signal (S) of the access point AP2 at a timing t6, receives the notification signal (S) of the access point AP3 at a timing t10, and receives the notification signal (S) of the access point AP4 at a timing t14.

Although the notification signal (S) includes information capable of identifying an operation channel, information about available frequencies, information about the beacon interval, and the like, details thereof will be described later. The communication terminal can ascertain the operation channels of the access points AP1 to AP4 from the information on the operation channels included in the received notification signals (S).

In the example shown in FIG. 5, it is possible to ascertain that the operation channel of the access point AP1 is f0 from the notification signal (S) of the access point AP1 received at the timing t2. Likewise, it is possible to ascertain that the operation channel of the access point AP2 is f12 from the notification signal (S) of the access point AP2 received at the timing t6, the operation channel of the access point AP3 is f8 from the notification signal (S) of the access point AP3 received at the timing t10, and the operation channel of the access point AP4 is f4 from the notification signal (S) of the access point AP4 received at the timing t14. In addition, the communication terminal can also ascertain that a beacon (B) has been transmitted in the operation channels of the access points AP1 to AP4 at a timing t0 from the information on the operation channels included in the received notification signals (S).

Although FIG. 5 shows only a state in which the communication terminal performs reception in the frequency channel f2, the communication terminal can perform a scanning operation over a discovery interval having the same duration as the beacon interval in any one of the available frequency channels f0 to f15 to collect notification signals from neighboring access points and search for the neighboring access points. That is, since the access points AP1 to AP4 operate in cooperation as shown in FIG. 4, the communication terminal can ascertain information on channels in which all the access points operate and beacon transmission timings by consecutively receiving arbitrary frequency channels.

That is, a communication terminal that newly enters a network can ascertain the presence of all neighboring access points with high efficiency only by searching for notification signals in an arbitrary frequency channel over a predetermined period without needing to scan all available frequency channels over the predetermined period. In addition, the communication terminal that newly enters the network can ascertain the presence of neighboring access points within a short time without transmitting a probe request.

Figure 6:
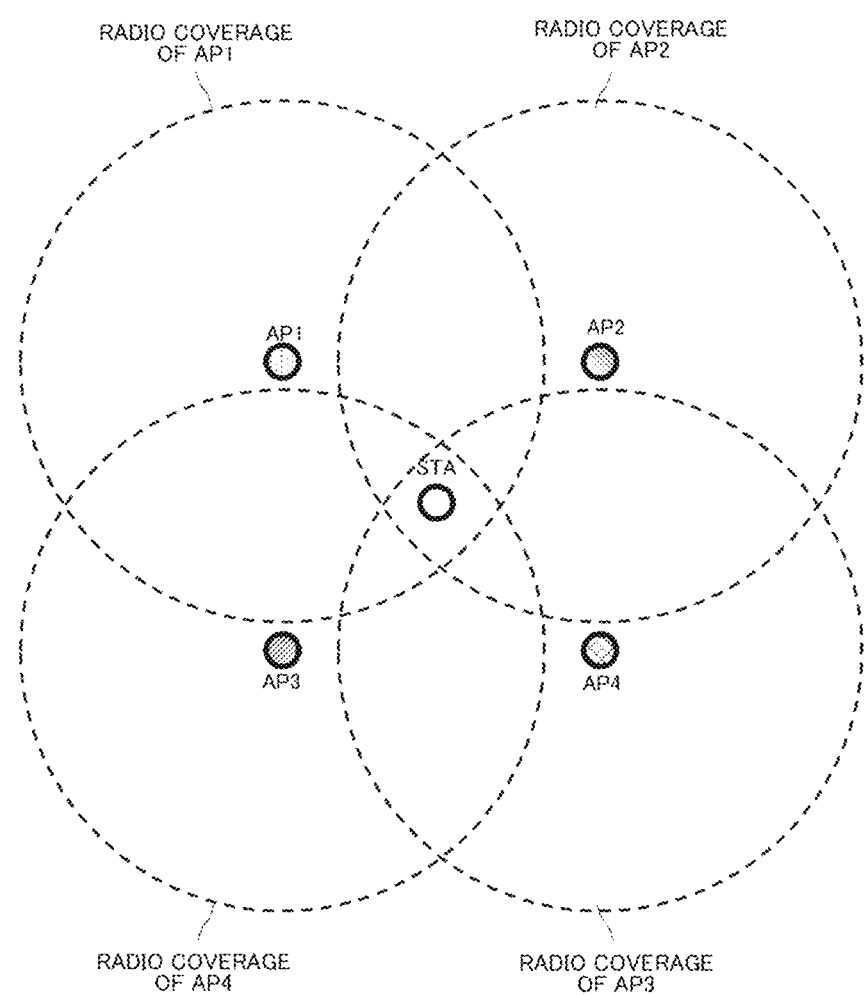
FIG. 6 is a diagram showing another example of an arrangement of access points and a communication terminal in a wireless network.

FIG. 6 shows another example of an arrangement of access points and a communication terminal in a wireless network. The figure schematically shows spatial positions at which 4 access points AP1 to AP4 are disposed. Circles drawn in broken lines schematically represent radio coverages of access points at the centers of the circles.

In the example shown in FIG. 6, the access points AP1 to AP4 are not present at positions at which intercommunication can be performed. Since the access points AP1 to AP4 cannot operate in cooperation in such a state, they independently set beacon intervals and thus beacon start positions may become different. Furthermore, it is also conceived that frequency directions in which channels are sequentially switched when the notification signals (S) are sequentially transmitted are not unified between the access points AP1 to AP4.

On the other hand, the communication terminal (STA) is present at a position at which it can receive signals from the access points AP1 to AP4. Accordingly, the communication terminal can connect to any of the access points AP1 to AP4 to enter the network.

Figure 7:
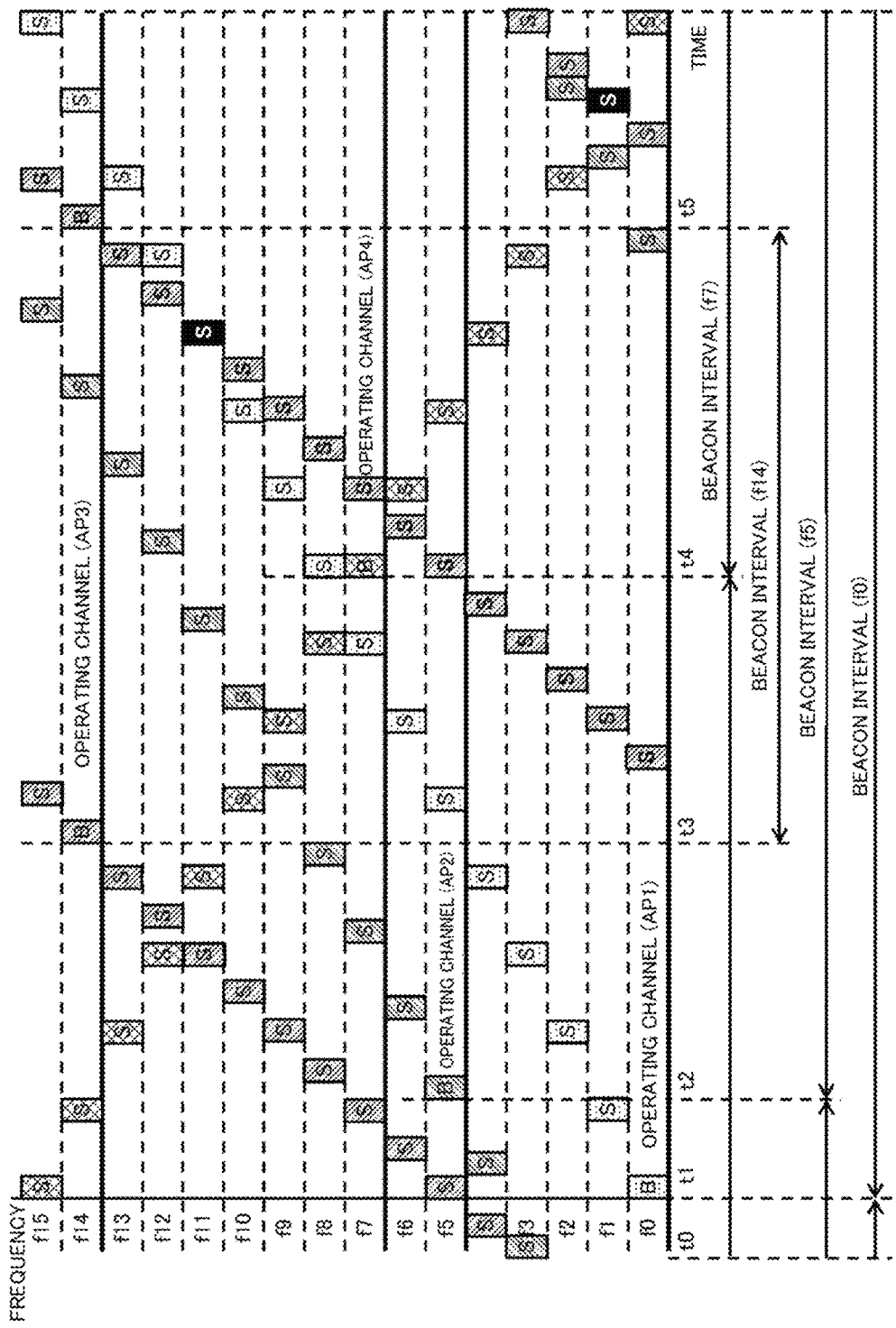
FIG. 7 is a diagram showing a state in which access points are asynchronously operating without cooperation.

FIG. 7 shows a state in which the access points AP1 to AP4 operate without cooperation. However, it is assumed that the access points AP1 to AP4 do not cooperate but they individually operate on the basis of the network management method proposed in the present description. In the figure, a vertical axis represents a frequency channel and a horizontal axis is a time axis. Further, 16 frequency channels f0 to f15 are present as available frequency channels. In addition, a quadrangle indicated on each horizontal axis represents a signal transmitted on the corresponding frequency channel. A quadrangle indicated by "B" is a beacon, and a quadrangle indicated by "S" is a notification signal. In addition, a signal transmitted by the access point AP1 is represented by a dot pattern, a signal transmitted by the access point AP2 is represented by being shaded with oblique lines downward to the right, a signal transmitted by the access point AP3 is represented by being shaded with oblique lines upward to the right, and a signal transmitted by the access point AP4 is represented by a lattice pattern.

The access points AP1 to AP4 do not cooperate, and thus they set different beacon intervals and beacon transmission timings and asynchronously operate. Among them, the access point AP1 sets a channel f0 as an operation channel and transmits a beacon (B) at a timing t1. In addition, the access point AP2 sets a channel f5 as an operation channel and transmits a beacon (B) at a timing t2, the access point AP3 sets a channel f14 as an operation channel and transmits a beacon (B) at a timing t3, and the access point AP4 sets a channel f7 as an operation channel and transmits a beacon (B) at a timing t4. In the lower part of FIG. 7, a beacon interval set on the operation channel f0 by the access point AP1, a beacon interval set on the operation channel f5 by the access point AP2, a beacon interval set on the operation channel f14 by the access point AP3, and a beacon interval set on the operation channel f7 by the access point AP4 are represented.

In addition, the access points AP1 to AP4 transmit notification signals while sequentially switching frequency channels after transmission of the beacons (B). However, the access points AP1 to AP4 sequentially transmit notification signals (S) in sequence patterns of sequentially switching channels variously in any of ascending order and descending order in the frequency direction at timings obtained by equally dividing the different beacon intervals by 16 that is the number of available channels. In the example shown in FIG. 7, the access points AP1, AP2, and AP3 sequentially switch frequency channels in a sequence pattern in ascending order in the frequency direction, whereas the access point AP4 sequentially switches frequency channels in a sequence pattern in descending order. In addition, the access points AP1 and AP2 transmit the beacons and the notification signals at the same transmission interval, whereas the access point AP3 transmits the beacon and the notification signal at a transmission interval shorter than that.

When the access points AP1 to AP4 are present at positions at which intercommunication cannot be performed, as shown in FIG. 6, they transmit the beacons and the notification signals without synchronization, as shown in FIG. 7. When the beacon transmission timings and the beacon intervals of the access points AP1 to AP4 are not unified and the sequence patterns of sequentially switching frequency channels are not consistent with each other, there are cases in which transmission timings of notification signals (S) coincide on the same frequency channel and thus a collision cannot be avoided. In FIG. 7, a signal at which a collision has occurred is represented in black, and the character "S" indicating the notification signal is represented in white.

Figure 8:
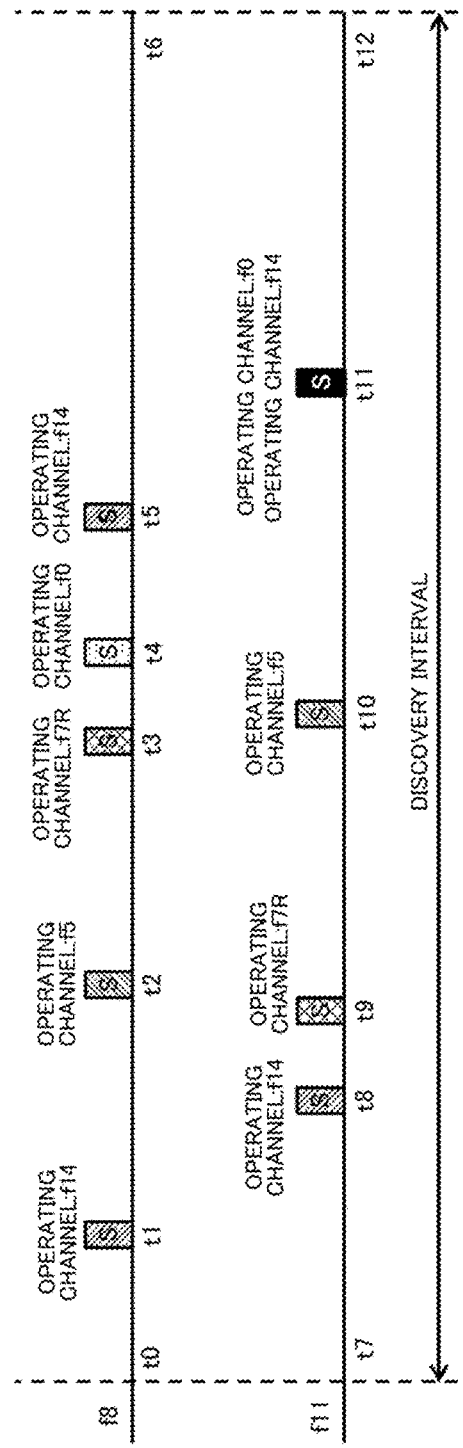
FIG. 8 is a diagram showing an example of an operation of a communication terminal searching for neighboring access points.

FIG. 8 illustrates an operation of a communication terminal to search for access points. Here, it is assumed that the access points AP1 to AP4 asynchronously operate as shown in FIG. 7.

The communication terminal collects notification signals from neighboring access points and search for the neighboring access points by performing reception over a predetermined discovery interval in an arbitrary frequency channel (the same as the above). FIG. 8 shows a state in which the communication terminal performs reception over the predetermined discovery interval in two frequency channels f8 and f11.

The communication terminal performs reception over a discovery interval from a timing t0 to a timing t6 in the frequency channel f8 first. Then, the communication terminal can identify that an operation channel of the access point AP3 is f14 upon reception of the notification signal (S) of the access point AP3 at a timing t1. Subsequently, the communication terminal can identify that an operation channel of the access point AP2 is f5 upon reception of the notification signal (S) of the access point AP2 at a timing t2. Subsequently, the communication terminal can identify that an operation channel of the access point AP4 is f7 and a sequence pattern of sequentially switching frequency channels is descending order (R) upon reception of the notification signal (S) of the access point AP4 at a timing t3. Subsequently, the communication terminal can identify that an operation channel of the access point AP1 is f0 upon reception of the notification signal (S) of the access point AP1 at a timing t4.

Thereafter, the communication terminal receives the notification signal (S) of the access point AP3 at a timing t5 again and recognizes that a beacon interval of the access point AP3 has been set to be short.

In a case where the access points AP1 to AP4 asynchronously operate, and the like, the communication terminal simultaneously performs receptions through a plurality of frequency channels f11 in the same discovery interval from the timing t0 to the timing t6 or continuously shifts to the frequency channels f11 to perform reception over a discovery interval from a timing t7 to a timing t12 to make absolutely sure. Then, the communication terminal confirms that the operation channel of the access point AP3 is f14 upon reception of the notification signal (S) of the access point AP3 at a timing t8. Subsequently, the communication terminal confirms that the operation channel of the access point AP4 is f7 and the sequence pattern of sequentially switching frequency channels is a descending order (R) upon reception of the notification signal (S) of the access point AP4 at a timing t9. Subsequently, the communication terminal confirms that the operation channel of the access point AP2 is f5 upon reception of the notification signal (S) of the access point AP2 at a timing t10. In addition, the communication terminal can detect that the notification signals (S) of the access point AP1 and the access point AP3 overlap (collide) at a timing t11.

Then, the communication terminal can ascertain the operation channels of the access points AP1 to AP4 from operation channel information included in the received notification signals (S). In the example shown in FIG. 8, it is possible to ascertain that the operation channel is f0 from the notification signal (S) of the access point AP1, ascertain that the operation channel is f5 from the notification signal (S) of the access point AP2, ascertain that the operation channel is f14 from the notification signal (S) of the access point AP3, ascertain that the operation channel is f7 from the notification signal (S) of the access point AP4, and additionally ascertain that the access points AP1 to AP4 set different beacon intervals and operate.

Although FIG. 8 shows only a state in which the communication terminal performs reception in the frequency channels f8 and f11, the communication terminal can collect notification signals from neighboring access points, search for the neighboring access points, and ascertain information on channels in which all access points operate and beacon transmission timings by performing reception over a predetermined period in arbitrary frequency channels other than f8 and f11. Even when the access points AP1 to AP4 operate without cooperation, the communication terminal can search for notification signals in an arbitrary frequency channel over a predetermined interval to ascertain the presence of neighboring access points.

That is, a communication terminal that newly enters a network can ascertain the presence of all neighboring access points only by searching for notification signals in an arbitrary frequency channel over a predetermined period without needing to scan all channels over the predetermined period. When neighboring access points asynchronously operate, a communication terminal may perform reception in two or more frequency channels to make absolutely sure. In any case, a communication terminal that newly enters a network can ascertain the presence of neighboring access points within a short time without transmitting a probe request.

Figure 9:
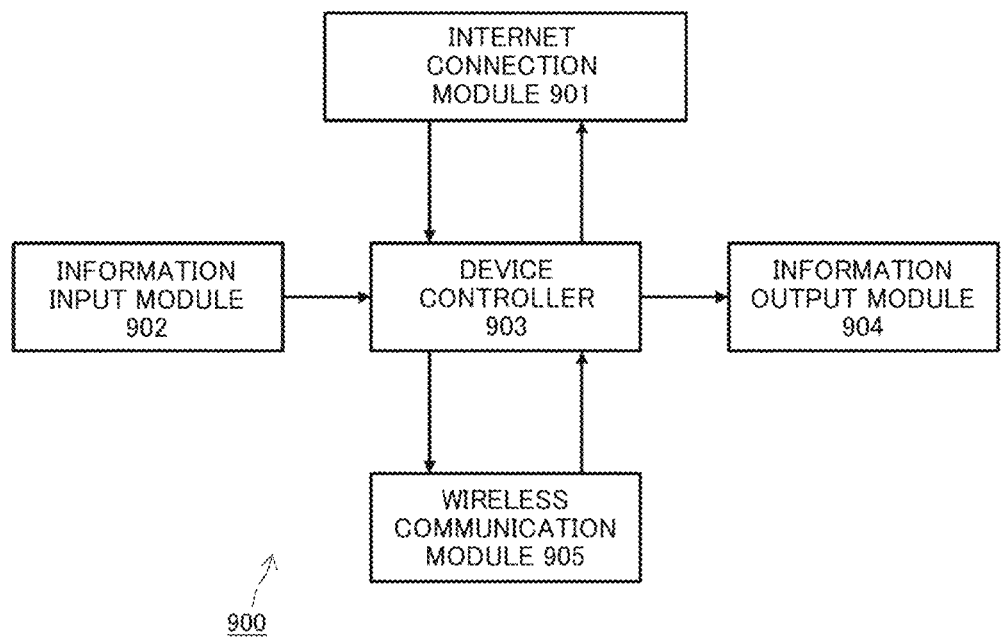
FIG. 9 is a diagram showing an example of a functional configuration of a communication device 900.

FIG. 9 schematically shows an example of a functional configuration of a communication device 900 capable of operating as a communication terminal and an access point. The illustrated communication device 900 includes an Internet connection module 901, an information input module 902, a device controller 903, an information output module 904, and a wireless communication module 905. However, the communication device 900 is composed of only modules necessary to operate as a communication terminal or an access point and thus can be configured such that unnecessary modules are simplified or are not incorporated, or the communication device 900 can also be configured to further incorporate other functional modules that are not illustrated.

The Internet connection module 901 has functions of a communication modem for connecting to the Internet, and the like and realizes Internet connection through a public communication line and an Internet service provider, for example, when the communication device 900 operates as an access point.

The information input module 902 is a functional module for inputting information conveying instructions from a user and is configured, for example, as a press button, a keyboard, a touch panel, or the like.

The device controller 903 is a functional module for performing control for causing the communication device 900 to operate as a communication terminal or an access point as a user has intended.

The information output module 904 is a functional module that presents an operating state of the communication device 900 and information obtained through the Internet to the user. The information output module 904 is configured, for example, as a display element such as a light emitting diode (LED), a liquid crystal panel, or an organic electroluminescence (EL) display, or a device such as a speaker outputting audio and music. The information output module 904 is configured to display or notify information and the like during or after processing in the device controller 903 for the user.

The wireless communication module 905 is a functional module for processing wireless communication in the communication device 900. Wireless communication mentioned here is assumed to include periodically transmitting a beacon and a notification signal while switching frequency channels as an access point, receiving a beacon and a notification signal as a communication terminal, and transmitting/receiving a data frame. Details of a wireless communication operation will be described later.

Figures 10, 11:
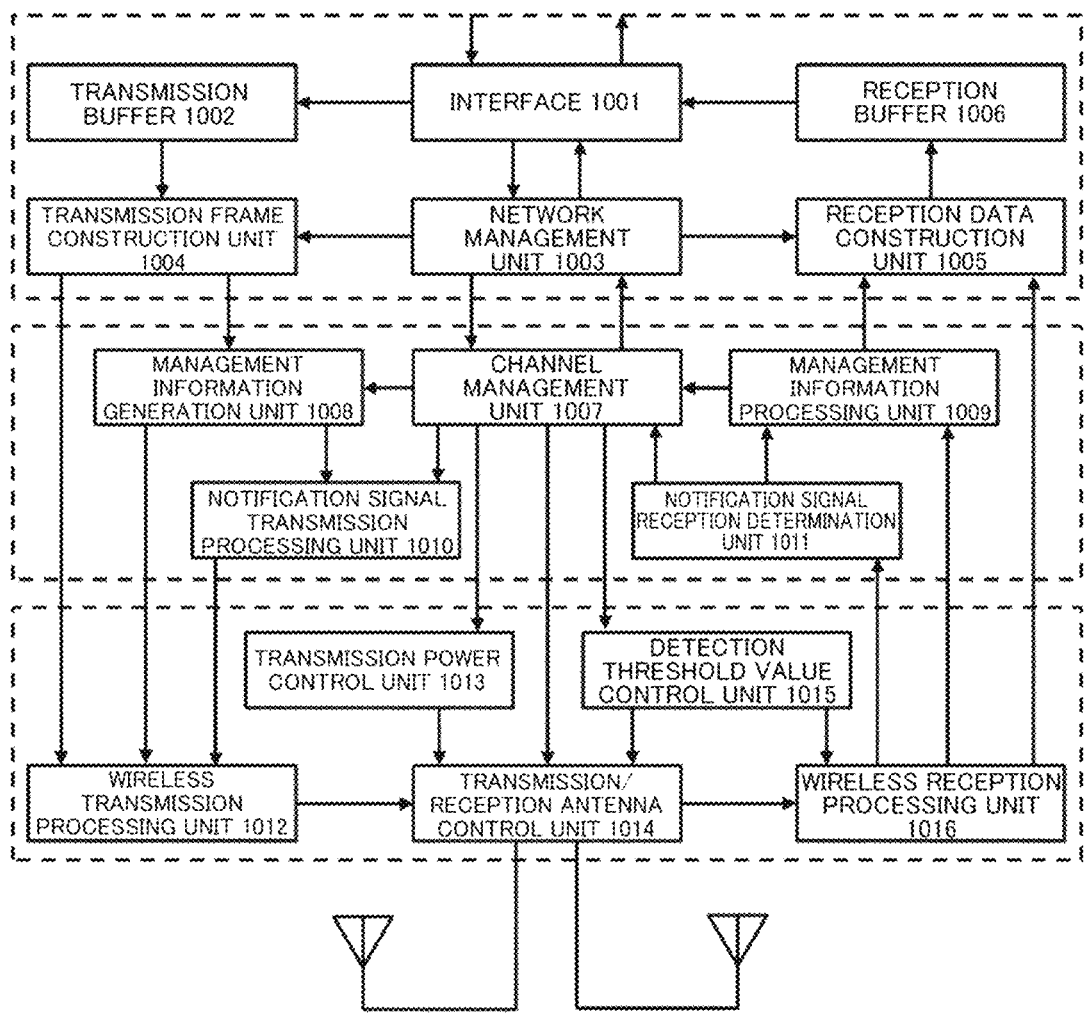
FIG. 10 is a diagram showing an example of an internal configuration of a wireless communication module 905 in the communication device 900.
FIG. 11 is a diagram showing an example of a configuration of a notification signal configured as a part of a preamble signal of a PHY layer.

FIG. 10 shows an example of an internal configuration of the wireless communication module 905 in the communication device 900 shown in FIG. 9. The illustrated wireless communication module 905 includes an interface 1001, a transmission buffer 1002, a network management unit 1003, a transmission frame construction unit 1004, a reception data construction unit 1005, a reception buffer 1006, a channel management unit 1007, a management information generation unit 1008, a management information processing unit 1009, a notification signal transmission processing unit 1010, a notification signal reception determination unit 1011, a wireless transmission processing unit 1012, a transmission power control unit 1013, a transmission/reception antenna control unit 1014, a detection threshold value control unit 1015, and a wireless reception processing unit 1016.

Further, the interface 1001, the transmission buffer 1002, the network management unit 1003, the transmission frame construction unit 1004, the reception data construction unit 1005, and the reception buffer 1006 are configured as parts common to software in a wireless LAN system. In addition, the wireless transmission processing unit 1012, the transmission power control unit 1013, the transmission/reception antenna control unit 1014, the detection threshold value control unit 1015, and the wireless reception processing unit 1016 are configured as parts common to baseband processing in the wireless LAN system.

The interface 1001 is a functional module for exchanging an input from a user, data from the Internet, and information to the user in a predetermined signal form.

The transmission buffer 1002 is a functional module for temporarily storing an input from the user and a signal to be wirelessly transmitted when the input and the signal have been received from the interface 1001.

The network management unit 1003 is a functional module that manages address information and the like of communication devices included in a wireless network. When the communication device 900 operates as an access point, the network management unit 1003 manages address information of a communication device (a communication terminal or the like) connected to a local station. In addition, when the communication device 900 operates as a communication terminal, the network management unit 1003 manages address information of an access point that is a connection destination.

In the present embodiment, an access point is configured to ascertain the presence of another access point present around. Accordingly, when the communication device 900 operates as an access point, the network management unit 1003 is configured to also manage information of another access point present around as necessary.

The transmission frame construction unit 1004 is a functional module for constructing wireless transmission data as a data frame for wireless transmission. In addition, the transmission frame construction unit 1004 is configured to collect a plurality of media access control (MAC) protocol data units (MPDUs) stored in the transmission buffer 1002 to construct an aggregation MPDU (A-MPDU).

The reception data construction unit 1005 is a functional module for reconstructing original data from a wirelessly received data frame. When an A-MPDU has been received, for example, the reception data construction unit 1005 removes predetermined header information from a data frame of the A-MPDU to extract MPDUs and extracts only a necessary data part.

The reception buffer 1006 is a functional module that temporarily stores data parts extracted by the reception data construction unit 1005 on the basis of sequence numbers until all data frames are collected. The reception buffer 1006 is configured to store received data until a timing at which data is output to an application device (not illustrated) connected via the interface 1001 arrives.

The channel management unit 1007 performs a channel scanning operation and operation channel setting. In addition, the channel management unit 1007 ascertains and manages channels in which other access points present around operate and beacon transmission timings.

Further, when the communication device 900 operates as an access point, the channel management unit 1007 performs dynamic setting of a frequency channel through which a notification signal will be transmitted in available channels, setting of a transmission timing, and the like to realize network operations as shown in FIGS. 1, 4, and 7.

The management information generation unit 1008 is a functional module that constructs a control frame and a management frame necessary for a communication control protocol. When the communication device 900 operates as an access point, the management information generation unit 1008 constructs a beacon frame necessary for network management.

The management information processing unit 1009 is a functional module that constructs control information necessary for the communication control protocol when a received frame is a control frame or a management frame. When a received frame is a beacon frame, the management information processing unit 1009 transfers parameters included in the beacon frame to the channel management unit 1007 and the network management unit 1003 such that they ascertain the parameters of an access point.

The notification signal transmission processing unit 1010 is a functional module added only when the communication device 900 operates as an access point. The notification signal transmission processing unit 1010 constructs a notification signal in which a parameter is automatically set according to a predetermined sequence and performs control of sequentially transmitting the notification signal to dynamically available frequency channels in a predetermined sequence pattern. Further, a configuration in which the parameter included in the notification signal is transferred from the channel management unit 1007 or the network management unit 1003 as necessary can also be employed.

The notification signal reception determination unit 1011 is a functional module that controls an operation of receiving notification signals from neighboring access points through a predetermined channel when the communication device 900 operates as either of a communication terminal and an access point. The notification signal reception determination unit 1011 is configured to uniquely determine a relationship between a timing at which a notification signal is received and an operation channel and ascertain all access points present around.

Further, when a received notification signal includes a parameter representing information about an operation channel of an access point that is a transmission source, a communication terminal can transmit a probe request to the corresponding access point using the operation channel to collect necessary parameters.

The wireless transmission processing unit 1012 is a functional module that adds a predetermined preamble to a frame such as a data frame to be wireless transmitted, converts the frame into a predetermined baseband signal, and processes the baseband signal as an analog signal in a predetermined frequency channel.

Although the wireless transmission processing unit 1012 is represented as a single functional module in FIG. 10, it may be divided into a processing unit that performs data transmission and reception through an operation channel and a processing unit that performs notification signal transmission and configured as a plurality of functional modules. In this case, a configuration in which different signals are supplied from the plurality of processing units to a transmission antenna may be employed.

In addition, when the wireless transmission processing unit 1012 is configured as a single processing unit and transmits a data frame (A-MPDU), a timing at which a notification signal is transmitted may be configured as a null MPDU (which will be described later) and control of appropriately switching to transmission of the notification signal may be performed at the timing.

The transmission power control unit 1013 is a functional module that controls transmission power such that a signal does not reach an unnecessary radio coverage when a predetermined frame is transmitted. In the present embodiment, it is assumed that the transmission power control unit 1013 is configured to adjust minimum necessary transmission power and control data transmission such that a signal reaches a receiving side with an intended received electric field strength.

The transmission/reception antenna control unit 1014 is connected to a plurality of antenna elements and performs control of wirelessly transmitting a signal as spatial multiplex streams and processing of receiving the signal transmitted as the spatial multiplex streams.

Further, when the communication device 900 operates as an access point, the transmission/reception antenna control unit 1014 may be configured to control a predetermined notification signal transmission timing and also control a timing of reception from a neighboring access point.

The detection threshold value control unit 1015 is a functional module that sets a signal detection level by which a signal from a communication device present in a radio coverage can be detected and performs control such that a signal can be detected with a minimum necessary detection threshold value when transmission power control has been performed. The detection threshold value control unit 1015 is configured to detect a signal equal to or higher than a predetermined detection level in a channel currently being used.

The wireless reception processing unit 1016 is a functional module that, when a predetermined preamble signal has been detected, separates individual streams and performs processing of receiving a header and a data part added after the preamble.

As a notification signal used in the present embodiment, various signal forms may be conceived. For example, a case in which the notification signal is configured as a part of a preamble signal of the PHY layer, a case in which it is configured as a short frame, a case in which it is configured as a long frame, a case in which it is configured as an information element, and the like may be considered.

FIG. 11 shows an example of a configuration of a notification signal configured as a part (dynamic identifier preamble) of the preamble signal of the PHY layer.

The notification signal shown in FIG. 11 includes a legacy short training field (legacy short training sequence: L-STF) and a legacy long training field (legacy long training sequence: L-LTF) at the head thereof as the preamble signal of the PHY layer and is configured such that all communication devices can obtain the preamble signal. The L-STF is used for, for example, synchronization acquisition and the L-LTF is used for, for example, accurate synchronization acquisition and channel estimation.

In addition, a dynamic identifier (DI)-SIG (DI-SIG) field that is new signal information for dynamic notification instead of a legacy signal (L-SIG) field follows the training fields. The DI-SIG is configured as simple information in which an error detection code (Cyclic Redundancy Code: CRC) and a tail bit are added to a minimum necessary operation channel number (Operation Channel) and an F/R order indicating a sequence pattern of sequentially switching frequency channels (either of ascending order and descending order in the frequency direction).

FIG. 12 shows an example of a configuration of a notification signal (short dynamic identifier signal) configured as a short frame.

The notification signal shown in FIG. 12 is configured as a short dynamic identifier signal following a legacy preamble structure (L-STF, L-LTF, and L-SIG).

This short dynamic identifier signal is configured in such a manner that an error detection code (frame check sequence: FCS) is added to a minimum necessary operation channel number (Operation Channel), an F/R order indicating a sequence pattern of sequentially switching frequency channels (either of ascending order and descending order in the frequency direction), and an available channel map indicating available channels. The available channel map represents available frequency channels in an access point that is a transmission source of this notification signal among all frequency channels allocated to a wireless network in a bitmap form.

FIG. 13 shows an example of a configuration of a notification signal (long dynamic identifier signal) configured as a long frame.

The notification signal shown in FIG. 13 is configured as a long dynamic identifier signal following a legacy preamble structure (L-STF, L-LTF, and L-SIG) (which is not illustrated in FIG. 13). This long dynamic identifier signal may have a structure of a common MAC frame, or parameters thereof may be disposed in an arrangement based on a general MAC header structure.

In the example shown in FIG. 13, the long dynamic identifier signal is configured in such a manner that an error detection code FCS is added to parameters such as a Frame Type indicating a predetermined frame form, a Duration Length indicating a duration of a frame, a Broadcast Address as a transmission destination address, an AP MAC Address as a transmission source address, an operation channel number (Operation Channel), a beacon interval, an F/R order indicating a sequence pattern of sequentially switching frequency channels (either of ascending order and descending order), an available channel map indicating an available channel map (the same as the above), and a neighboring AP channel map indicating an operation channel of a neighbor access point present in an overlapping manner. The neighbor AP channel map indicates operation channels of neighbor access points among frequency channels allocated to a wireless network in a bitmap form. A communication terminal that has received this notification signal can use the neighbor AP channel map at the time of switching access points, and the like.

FIG. 14 shows an example of a configuration of a notification signal configured as an information element.

The notification signal shown in FIG. 14 is defined as a dynamic identifier information element applied when it is configured by being added to another frame or the like.

The dynamic identifier information element is configured in such a manner that an error detection code FCS is added to parameters such as a Length indicating an information length of a child element of an element ID indicating a predetermined information element form, an operation channel number (Operation Channel), a beacon interval (Beacon Interval), an F/R order indicating a sequence pattern of sequentially switching frequency channels (either of ascending order and descending order), an available channel map indicating an available channel map (the same as the above), and a neighbor AP channel map indicating an operation channel of a neighbor access point present in an overlapping manner.

In addition, the dynamic identifier information element may include an AP MAC Address as a transmission source address, an AP Type indicating a type of a corresponding access point, and identification information (BSS Color) of a network (Basic Service Set: BSS) configured by the access point. The BSS Color is short information having a length of 6 bits, for example, for identifying a BSS in an extended service set (ESS).

Figure 15:
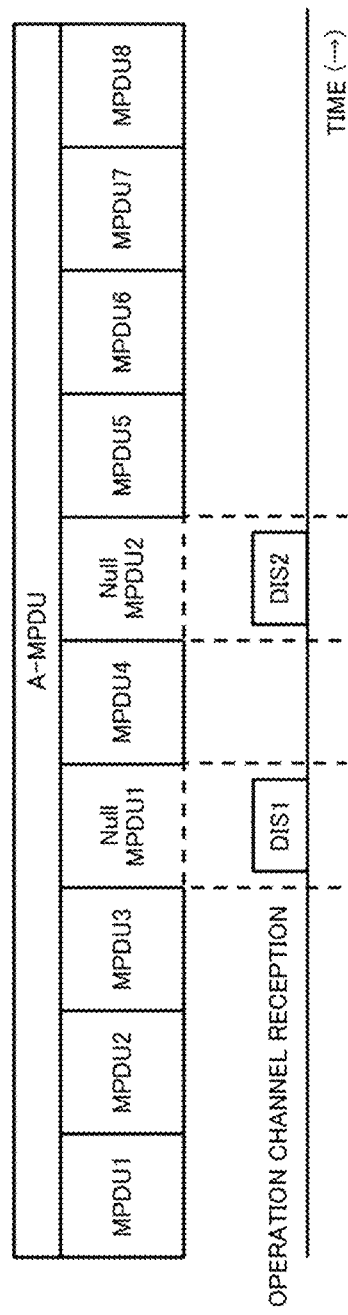
FIG. 15 is a diagram showing an overview of an aggregation data frame structure.

FIG. 15 shows an overview of an aggregation data frame structure used in the present embodiment.

An aggregation data frame is an A-MPDU constructed by collecting a plurality of MPDUs. A single MPDU becomes a retransmission unit. The present embodiment employs a configuration in which a null MPDU in which a data part is not present is inserted at a timing at which arrival of a notification signal from another access point is assumed to construct an A-MPDU to avoid interruption of reception of a notification signal.

Referring to FIG. 15, the A-MPDU is configured as a frame in which a plurality of MPDUs MPDU1 to MPDU8 are connected, as an aggregation data frame to which a predetermined preamble (not illustrated) has been added.

For example, when arrival of a notification signal (DIS1) is assumed after MPDU3 and before MPDU4 in an operation channel, null MPDU1 is inserted in the middle of this A-MPDU such that the notification signal can be received to configure the frame. In addition, when arrival of a notification signal (DIS2) is assumed after MPDU4 and before MPDU5 in an operation channel, null MPDU2 is inserted in the middle of this A-MPDU such that the notification signal can be received to configure the frame.

Further, the aggregation data frame may be configured by adding some training signals included in a preamble immediately before a null MPDU to allow a receiving side to easily acquires synchronization as necessary.

Figure 16:
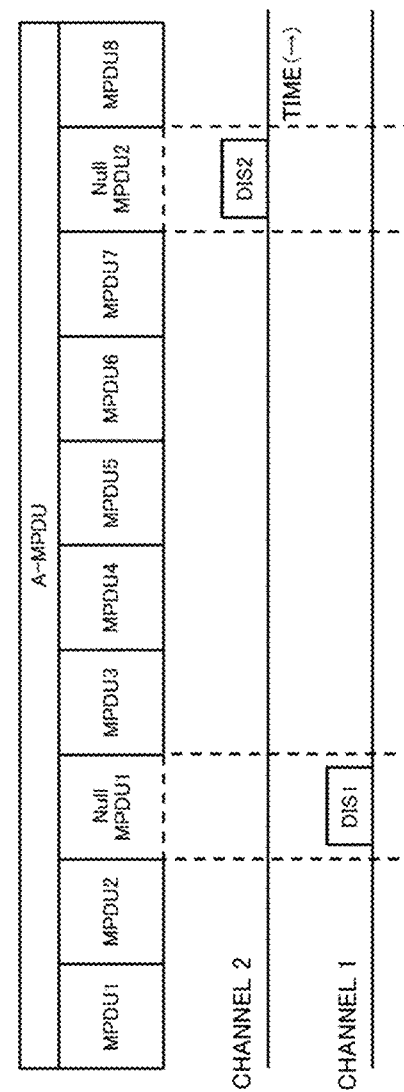
FIG. 16 is a diagram showing an overview of a modified example of the aggregation data frame structure.

FIG. 16 shows an overview of a modified example of the aggregation data frame structure used in the present embodiment.

FIG. 15 shows the frame structure in which a null MPDU is inserted at a timing at which a notification signal is received. On the other hand, FIG. 16 shows an example of a configuration in which a null MPDU is inserted at a timing at which a notification signal will be transmitted by an access point. By inserting the null MPDU at the timing at which a notification signal will be transmitted to configure a frame, the single wireless transmission processing unit 1012 can process the notification signal and the data frame (A-MPDU).

Referring to FIG. 16, the A-MPDU is configured as a frame in which a plurality of MPDUs MPDU1 to MPDU8 are connected, as an aggregation data frame to which a predetermined preamble (not illustrated) has been added.

For example, when a notification signal (DIS1) is transmitted after MPDU2 and before MPDU3 in channel 1, null MPDU1 is inserted in the middle of this A-MPDU such that the notification signal can be transmitted to configure the frame. In addition, when a notification signal (DIS2) is transmitted after MPDU7 and before MPDU8 in channel 2, null MPDU2 is inserted such that the notification signal can be transmitted to configure the frame.

Further, the aggregation data frame may be configured by adding some training signals included in a preamble immediately before a null MPDU to allow a receiving side to easily acquires synchronization as necessary (the same as the above).

Figure 17:
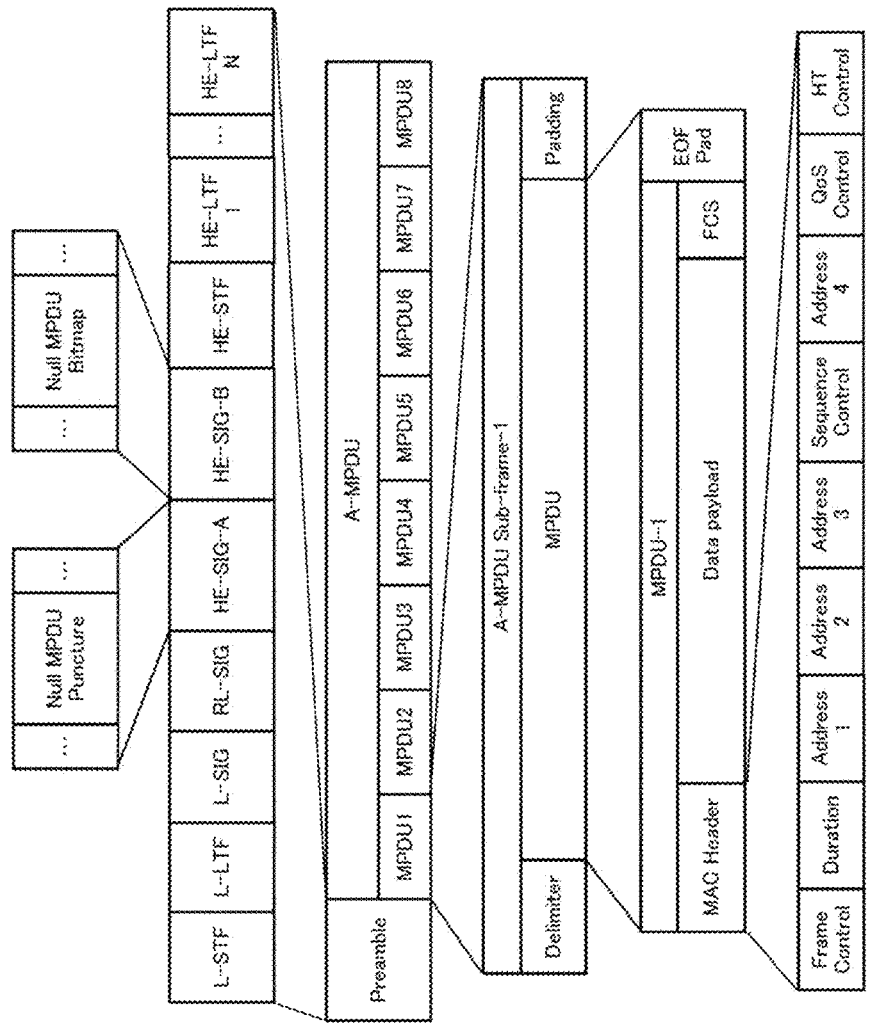
FIG. 17 is a diagram showing an internal structure of an aggregation data frame.

FIG. 17 shows an internal structure of an aggregation data frame used in the present embodiment. The figure shows a detailed internal structure of an A-MPDU including a null MPDU.

A preamble of an A-MPDU frame including a null MPDU is composed of an L-STF, an L-LTF, an L-SIG, a, RL-SIG, an HE-SIG-A, an HE-SIG-B, a high efficiency (HE)-STF (HE-STF), and an HE-LTE group (HE-LTF 1, . . . , HE-LTF N).

Here, a null MPDU puncture bit for identifying that the null MPDU is included is prepared as the parameter HE-SIG-A included in the preamble. It is possible to represent that the A-MPDU includes the null MPDU by setting this null MPDU frame puncture bit.

In addition, a null MPDU bitmap field indicating position information of the null MPDU in a bitmap form is prepared as the parameter HE-SIG-B included in the preamble. It is possible to represent that the null MPDU is included in a position of a corresponding MPDU in the A-MPDU frame by writing "1" in this null MPDU bitmap field.

Further, a delimiter and padding are respectively added to the head and the end of each MPDU configured as an A-MPDU subframe. The MPDU part is composed of a MAC header, a data payload, and an error detection code FCS, and padding (Pad) is performed at the end of the frame (EOF). Further, the format of the MAC header basically conforms to the IEEE 802.11 standard, and thus detailed description is omitted here.

Here, padding is added to the delimiter of a subframe configured as the null MPDU, and the MPDU part is configured in a state in which there is no signal as the null MPDU. The period of this null MPDU is configured as a timing at which a notification signal (dynamic identifier signal: DIS) can be identified over a time including a predetermined transmission/reception switching timing.

FIG. 18 and FIG. 19 show examples of information entry in available channel maps indicating an available channel map. An available channel map is included in a notification signal configured as a frame (refer to FIG. 12 and FIG. 13) and a notification signal configured as an information element (refer to FIG. 14) and represents available frequency channels in an access point that is a transmission source of a notification signal among all frequency channels allocated to a wireless network in a bitmap form.

FIG. 18 shows an example of information entry in an available channel map in a case of using a 5 GHz band and a new 6 GHz band. The illustrated available channel map is composed of a total of 64 bitmaps 0 to 63 (i.e., 6-bit length) and describes a corresponding relationship between a bit position and a frequency channel on the bitmaps. For example, a 0-th bit position is allocated to channel 36, a third bit position is allocated to channel 48, and a thirty-eighth bit position is allocated to new channel N07, and "1" is written at a bit position corresponding to a channel to represent that the channel is available.

In addition, FIG. 19 shows an example of information entry in an available channel map in a case of using a new 6 GHz band. The illustrated available channel map is composed of a total of 32 bitmaps 0 to 31 (i.e., 5-bit length) and describes a corresponding relationship between a bit position and a frequency channel on the bitmaps. For example, a 0-th bit position is allocated to channel N01, a third bit position is allocated to channel N04, and a twenty-eighth bit position is allocated to new channel N29, and "1" is written at a bit position corresponding to a channel to represent that the channel is available.

Although a lower bit of a bitmap represents a low frequency channel and an upper bit represents a high frequency channel in the examples shown in FIG. 18 and FIG. 19, available channel maps may be configured in reverse order.

Figure 20:
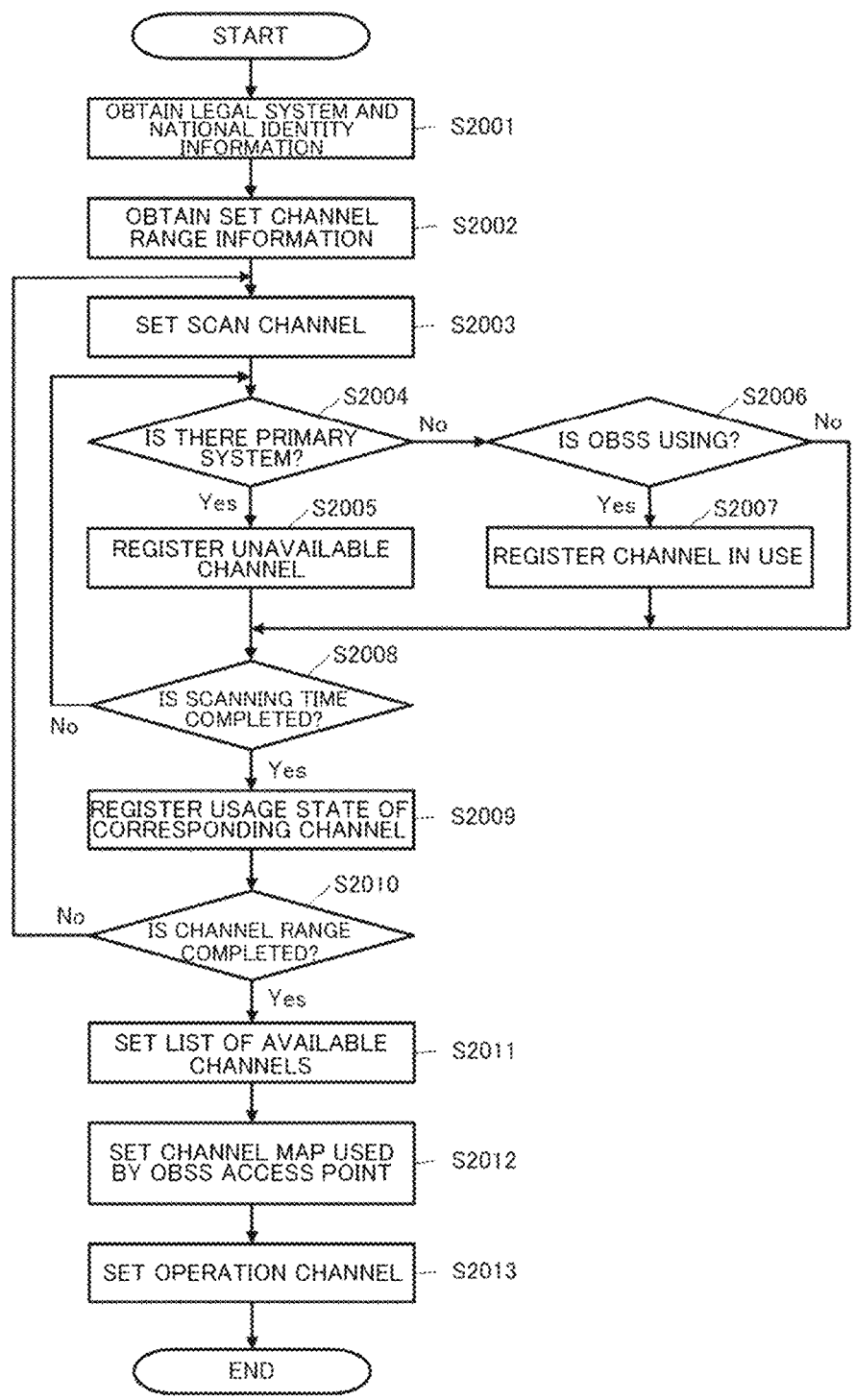
FIG. 20 is a flowchart showing a processing procedure through which an access point performs initial setting.

FIG. 20 shows a processing procedure through which an access point performs initial setting in a flowchart form. The illustrated processing procedure is executed in the communication device 900 operating as an access point.

First, the access point identifies a position at which it is currently placed and obtains a legal system and national identity information for operating in a specific frequency band (6 GHz band or the like) (step S2001).

From information on a country and a position at which the access point is installed, parameters of frequency channels available in that area can be identified. Accordingly, this information may be obtained in advance from information such as a destination at the time of factory shipment to obtain information capable of identifying a country and an area in which the communication device 900 operating as the access point will be sold.

Then, the access point obtains set channel range information (step S2002). Accordingly, the access point accesses, for example, a data server in which information on frequency channels available in the country and area is stored in advance to obtain parameters such as frequency channels of frequency bands available at this point in time, and transmission power setting.

Then, the access point sets one of the available frequency bands as a scan channel according to the information obtained above (step S2003) and performs a reception operation over a maximum length of a beacon interval, for example.

Here, the access point checks whether the scan channel is used by a primary operation system (step S2004). While a configuration in which a predetermined database is accessed to ascertain a channel used by the primary operation system may be employed here, when it is determined that the channel is used by the primary operation system from a received electric field strength of the channel (Yes in step S2004), the access point registers the channel as an unavailable channel (step S2005). Alternatively, when the scan channel is not used by the primary operation system (No in step S2004), the access point attempts to detect a signal from an overlapping BSS (OBSS) other than the access point (step S2006). Then, when a signal from the OBSS is detected (step S2006), the access point registers the channel as a channel in use (step S2007).

The access point repeatedly checks whether the scan channel is used by the primary operation system or the OBSS over a predetermined scanning time (No in step S2008). Here, although the access point returns to step S2004 and performs signal detection in the scan channel over a predetermined scanning period, the access point can determine the channel as an available channel when a signal has not been detected in the channel.

Further, when the scanning time is completed (step S2008), the access point registers the usage state of the scan channel (step S2009).

To scan the entire channel range (No in step S2010) set to be used in the frequency band (i.e., the channel range obtained in step S2002), the access point returns to step S2003, resets a scan channel, and repeatedly performs checking whether the scan channel is used and checking the usage state of the scan channel.

Then, when scanning in the entire channel range is completed (Yes in step S2010), the access point sets a list of the available channels (step S2011), sets a map of channels used by neighboring access points as OBSSs (step S1012), sets an operation channel of the access point among vacant channels and the like in consideration of the map, and ends this processing (step S2013).

Figure 21:
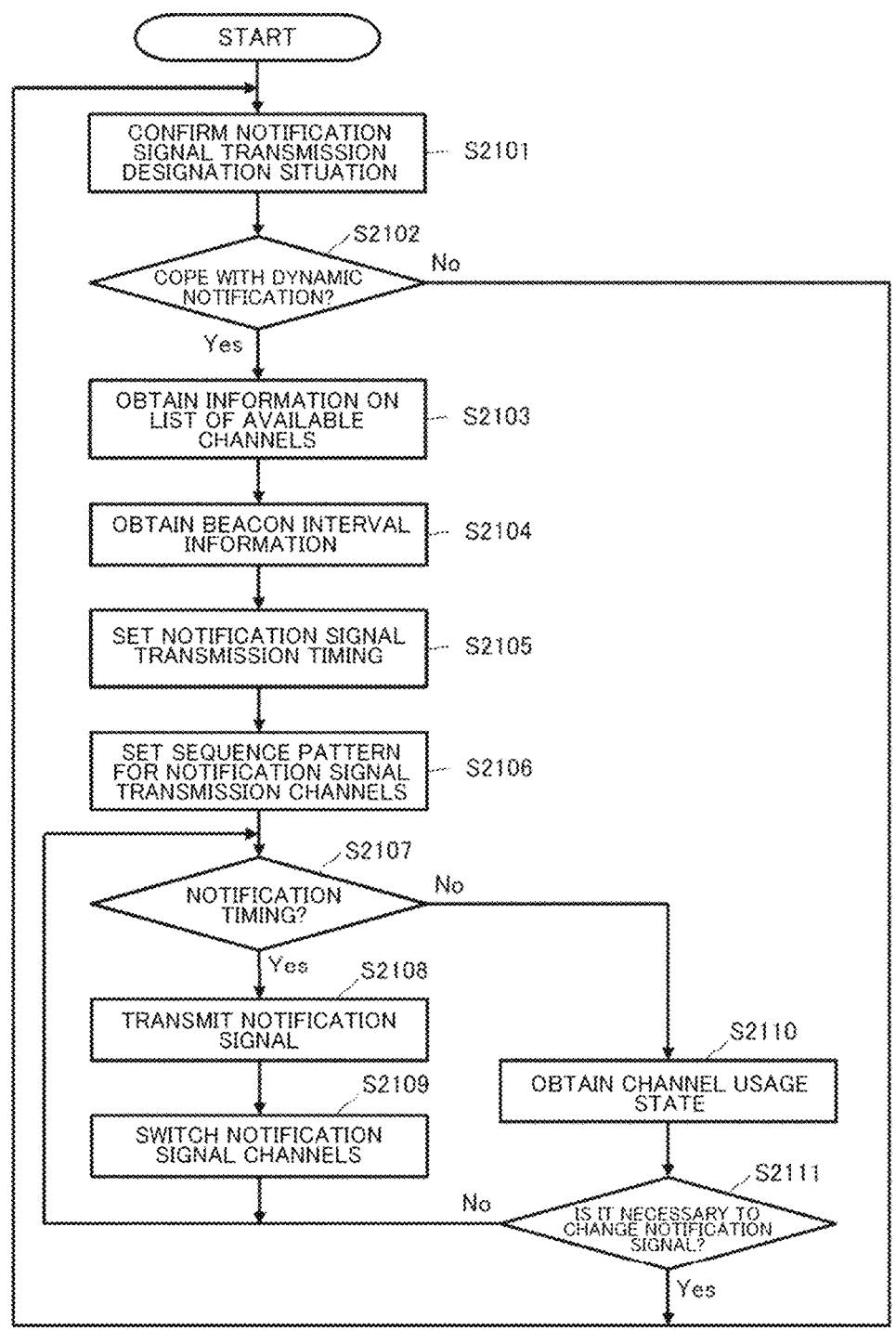
FIG. 21 is a flowchart showing a processing procedure through which an access point transmits a notification signal.

FIG. 21 shows a processing procedure through which an access point transmits a notification signal in a flowchart form. The illustrated processing procedure is executed in the communication device 900 operating as an access point.

First, the access point confirms a state in which execution of a notification signal transmission operation is designated (step S2101).

When dynamic notification signal transmission is set (Yes in step S2102), the access point performs notification signal transmission according to the sequence below. When dynamic notification signal transmission is not set (No in step S2102), the access point returns to step S2101 and determines whether it is necessary to reset notification signal transmission again.

The access point obtains information on a list of available channels (step S2103), obtains information on a beacon interval (step S2104), and sets a notification signal transmission timing from these parameters (step S2105). As described above, the access point sets each of timings obtained by equally dividing the beacon interval by the number of available channels as the notification signal transmission timing.

Further, the access point randomly sets whether a sequence pattern of transmission channels for the notification signal is ascending order or descending order for each frequency channel (step S2106). Alternatively, when the access point operates in cooperation with a neighboring access point, the access point unifies and sets sequence patterns as either of ascending order and descending order with the neighboring access point.

Then, the access point performs notification signal transmission (step S2108) and switches channels for the notification signal according to the set sequence pattern (step S2109) whenever a notification signal notification timing arrives (Yes in step S2107).

On the other hand, the access point obtains a channel usage state (step S2110) and determines whether it is necessary to change the notification signal (step S2111) in a period other than the notification timing (No in step S2107). The access point obtains a channel usage state on the basis of contents of a notification signal received from a neighboring access point in the operation channel thereof, for example.

If it is not necessary to change the notification signal (No in step S2111), the access point returns to step S2107 and proceeds to determination of a notification signal transmission timing.

On the other hand, if it is necessary to change the notification signal (Yes in step S2111), the access point returns to step S2101 and determines whether it is necessary to reset notification signal transmission again.

Figure 22:
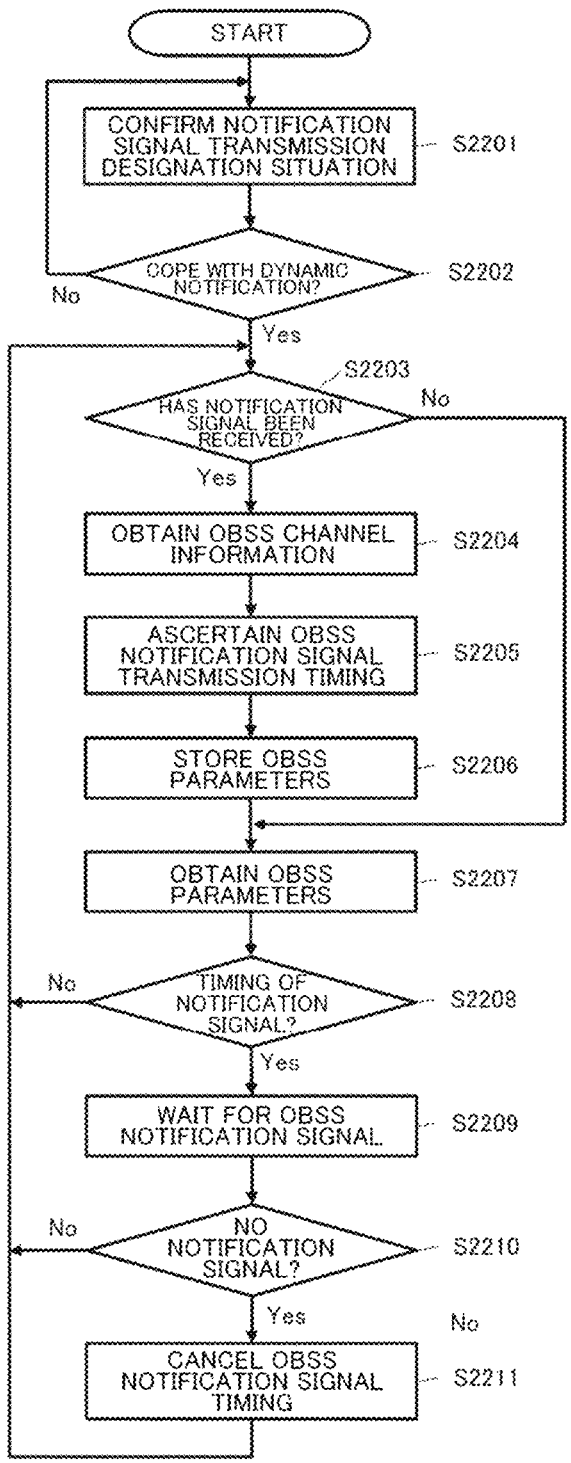
FIG. 22 is a flowchart showing a processing procedure performed by an access point in a steady state.

FIG. 22 shows a processing procedure performed by an access point in a steady state in a flowchart form. The illustrated processing procedure is executed in the communication device 900 operating as an access point.

First, the access point confirms a situation in which execution of a notification signal transmission operation is designated (step S2201).

When dynamic notification signal transmission is set (Yes in step S2202), the access point performs notification signal transmission according to the sequence below.

When a notification signal is received (Yes in step S2203), the access point obtains parameters included in the notification signal received from a neighboring access point as channel information of an OBSS (step S2204), ascertains a timing of the OBSS notification signal in this operation channel (step S2205), and stores the same as OBSS parameters (step S2206).

Further, when these necessary OBSS parameters are not included in the notification signal received in step S2203, the access point may move to the operation channel thereof, transmit a predetermined probe request to a neighboring access point, and receive a probe response to collect necessary parameters as necessary.

Then, the access point obtains OBSS parameters (step S2207), and waits for a notification signal from the OBSS (step S2209) when the timing of the notification signal has arrived (Yes in step S2208).

Here, when no notification signal has arrived (step S2210), the access point cancels the timing of the OBSS notification signal (step S2211). Thereafter, the access point returns to step S2203 and waits for the next notification signal.

Further, when the access point cancels the timing of the OBSS notification signal, the access point may cancel the setting when notification signals are not continuously received a plurality of times.

Figure 23:
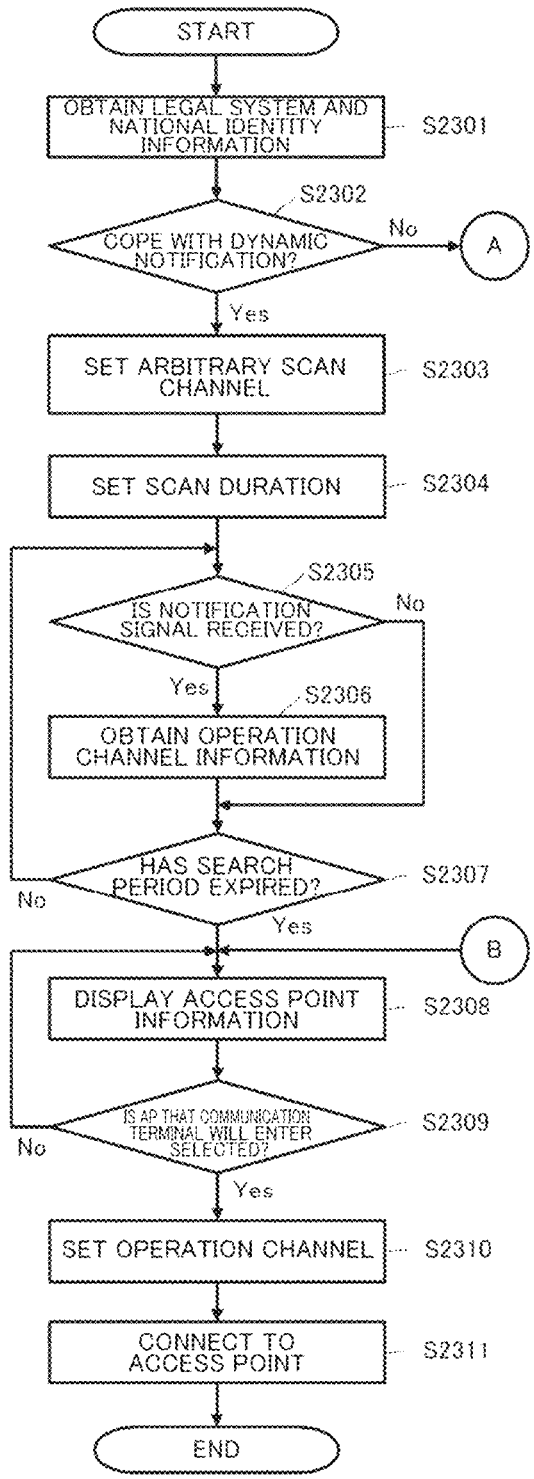
FIG. 23 is a flowchart showing a processing procedure (initial half) performed by a communication terminal.
Figure 24:
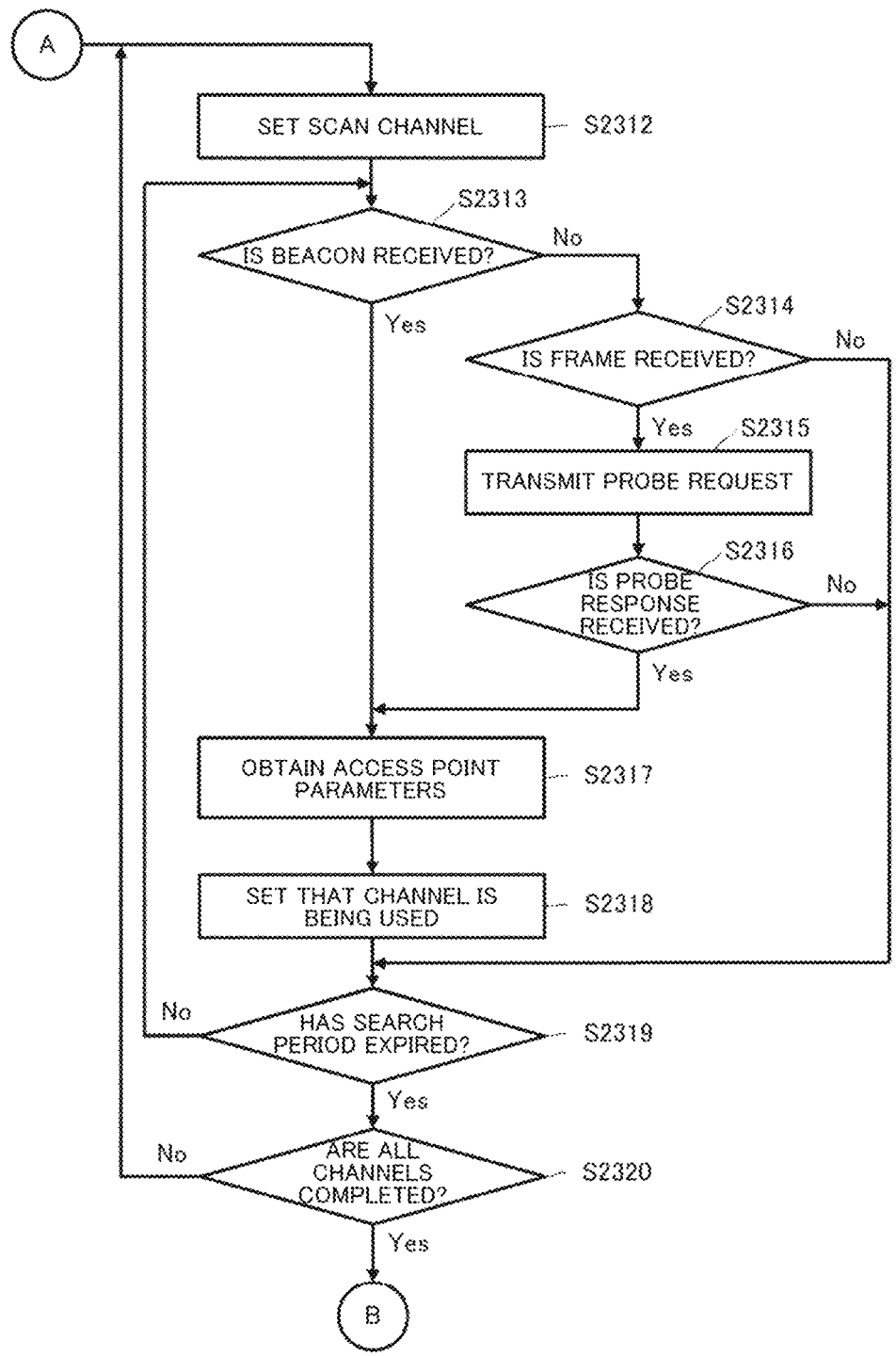
FIG. 24 is a flowchart showing a processing procedure (latter half) performed by a communication terminal.

FIG. 23 and FIG. 24 show a processing procedure performed by a communication terminal in a flowchart form. The illustrated processing procedure is executed in the communication device 900 operating as a communication terminal.

First, the communication terminal identifies a position at which it is currently placed and obtains a legal system and a national identity information for operating in a specific frequency band (6 GHz band or like) (step S2301).

From information on a country and a position at which the communication terminal is installed, parameters of frequency channels available in that area can be identified. Accordingly, this information may be obtained in advance from information such as a destination at the time of factory shipment to obtain information capable of identifying a country and an area in which the communication device 900 operating as the communication terminal will be sold. Alternatively, the position at which the communication terminal is currently placed may be identified from positioning information and the like from a positioning satellite (a global positioning system (GPS) or the like), or a current country or area may be identified by receiving a signal from a public communication network and analyzing the signal.

Then, if the communication terminal copes with reception of a dynamic notification signal (DIS) (Yes in step S2302), the communication terminal sets scanning in an arbitrary frequency channel (step S2303) and sets a duration in which scanning will be performed (step S2304).

That is, if a duration assumed to be a maximum time of a beacon interval is set, the communication terminal can receive a beacon signal and a notification signal.

Then, if the communication terminal has been able to receive a notification signal (step S2305), the communication terminal obtains operation channel information of an access point that is a transmission source of the notification signal on the basis of the contents of the received notification signal (step S2306).

The communication terminal returns to step S2305 and waits for a notification signal until a scanning period expires (No in step S2307). Then, the communication terminal displays information on the access point obtained through notification signal reception processing to a user as necessary (step S2308) after the scanning period expires (Yes in step S2307). The communication terminal can present the information on the access point to the user, for example, using the information output module 904.

Here, when the user selects an access point that the user will enter (Yes in step S2309), the communication terminal sets an operation channel of the access point selected by the user (step S2310), connects to the access point (step S2311), and operates as a communication terminal subordinate to the access point.

On the other hand, when the communication terminal does not cope with reception of a dynamic notification signal (No in step S2302), the communication terminal individually sets a scan channel (step S2312). Then, if a beacon is received in this scan channel (Yes in step S2313), the communication terminal proceeds to step S2317 and obtains parameters of an access point from the received beacon.

In addition, when the communication terminal receives some frames (Yes in step S2314), the communication terminal transmits a probe request to an access point that is a transmission source of the frames as necessary (step S2315). Then, if a probe response is received from the access points (Yes in step S2316), the communication terminal obtains parameters of the access point from the probe response frame (step S2317).

Then, the communication terminal sets that the channel is being used by the access point (step S2318). In addition, when the communication terminal does not receive any frame (No in step S2314) or does not receive a probe response frame for the probe request (No in step S2316), the communication terminal does not set that the channel is being used by the access point.

The communication terminal repeatedly performs access point search processing including steps S2313 to S2318 in the channel individually set in step S2312 until a predetermined scanning period expires (No in step S2319).

In addition, when the scanning period expires (Yes in step S2319), the communication terminal returns to step S2312, resets a scan channel, and repeatedly performs the access point search processing including steps S2313 to S2318 until the access point search processing is completed in all channels (No in step S2320).

Then, when the access point search processing is completed in all channels (Yes in step S2320), the communication terminal displays information on an access point to the user (step S2308), sets an operation channel of an access point selected by the user (steps S2319 and S2310), connects to the access point (step S2311), and operates as a communication terminal subordinate to the access point as necessary.

Figure 25:
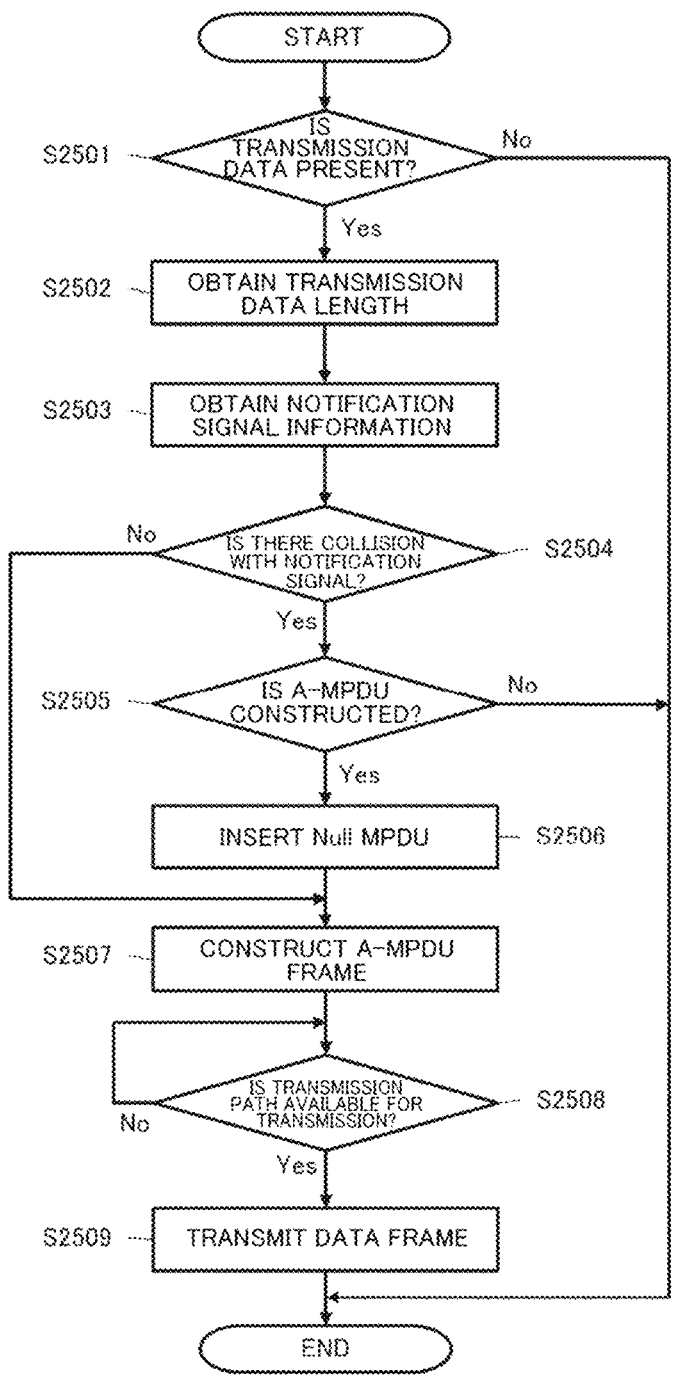
FIG. 25 is a flowchart showing a processing procedure for performing data transmission through an A-MPDU frame.

FIG. 25 shows a processing procedure processing procedure for performing data transmission through an A-MPDU frame by the communication device 900 operating as an access point or a communication terminal in a flowchart form. The communication device 900 transmits a data frame while avoiding a transmission timing of a notification signal of a neighboring access point basically. In addition, when the communication device 900 serves as an access point, it transmits a data frame such that the data frame does not overlap a notification signal transmitted thereby.

When the communication device 900 receives, from an upper layer such as an application layer, data to be transmitted, the communication device 900 stores the transmission data in the transmission buffer 1002, determines that the transmission data is present (Yes in step S2501) and obtains a transmission data length (step S2502).

Then, the communication device 900 obtains timing information of notification signals (step S2503) and checks whether the aforementioned data transmission collides with the notification signals (step S2504). Here, the notification signals include both a notification signal sent from a neighboring access point and a notification signal transmitted by the communication device 900 when the communication device 900 operates as an access point.

When the data transmission collides with a notification signal (Yes in step S2504), the communication device 900 determines whether to construct an A-MPDU (step S2505).

In step S2505, the communication device 900 determines that an A-MPDU is not constructed when a single MPDU collides with a notification signal or when it is difficult to construct an A-MPDU such that it does not collide with a notification signal because intervals of a plurality of notification signals become close each other even when the A-MPDU has been constructed.

In addition, when it is determined that an A-MPDU is constructed (Yes in step S2505), the communication device 900 inserts a null MPDU at a position of an MPDU colliding with a notification signal such that the timing of the notification signal becomes a buffering period (step S2506) and constructs the A-MPDU frame (step S2507).

Further, when the data transmission does not collide with the notification signals (No in step S2504), the communication device 900 constructs a data frame without inserting a buffering period such as a null MPDU (step S2507).

Then, the communication device waits until a transmission path becomes available for transmission (Yes in step S2508), and then the communication device 900 transmits the data frame constructed in step S2506 (step S2509).

Further, when transmission data is not present (No in step S2501), the communication device 900 skips all the subsequence processing steps and ends the present processing.

In addition, when an A-MPDU is not constructed (No in step S2505) although the data transmission collides with a notification signal (Yes in step S2504), the communication device 900 holds the data transmission and temporarily ends the present processing. However, the communication device 900 is assumed to resume processing from step S2501 thereafter.

If the notification signal here is a notification signal sent from a neighboring access point, a null MPDU is inserted at a position of an MPDU corresponding to the notification signal in the A-MPDU frame such that a collision with the signal does not occur (refer to FIG. 15). In addition, if the notification signal here is a notification signal transmitted by the communication device 900 serving as an access point, a null MPDU is inserted at a position of an MPDU corresponding to the notification signal in the A-MPDU frame, and the communication device 900 switches channels at a transmission timing of the notification signal thereof and transmits the notification signal (refer to FIG. 16).

To sum up, in the network management method proposed in the present description, a communication device serving as an access point sequentially switches available frequency channels and transmits a short notification signal, and a communication device operating as a communication terminal collects notification signals in any frequency channel, and thus it is possible to ascertain the presence of an access point present around and reduce a channel scanning time.

In addition, in the network management method proposed in the present description, an access point selects either of ascending order and descending order as a sequence pattern of sequentially switching frequency channels through which a notification signal is transmitted, and thus it is possible to avoid complete coincidence of notification signal timings between the access point and a neighboring access point.

A communication device serving as an access point sets an operation channel used for normal data transmission, transmits a beacon signal on the operation channel at a predetermined beacon interval, and transmits a notification signal including information capable of identifying the operation channel while sequentially switching other frequency channels. A communication device operating as a communication terminal that enters the access point can wait for the notification signal in at least one scan channel to obtain information on the operation channel and perform processing of entering a network on the operation channel.

Furthermore, an access point can collect notification signals from neighboring access points in an operation channel. Then, information acquired from notification signals is exchanged between access points and between communication terminals subordinate to the access point to ascertain a notification signal timing, and the communication devices (access point and communication terminal) hold off data transmission not to interfere with notification signals. For example, when an aggregated data frame (A-MPDU) is transmitted, a null MPDU in which a data part is not present is inserted into an MPDU overlapping with a notification signal timing, control of setting data reception is executed, and transmission is performed such that an error is not included in data.

In addition, when a communication device serving as an access point transmits data on an operation channel at a timing at which a notification signal is transmitted on a frequency channel other than the operation channel, the communication device may insert a null MPDU in which a data part is not present at the transmission timing of the notification signal and construct data.

Finally, the effects obtained by the network management method proposed in the present description are described below.

(1) Since a notification signal is periodically transmitted through all channels available in an access point, a communication terminal can ascertain an operation channel if it can receive a notification signal through an arbitrary channel.

(2) A communication terminal that newly enters a network can ascertain the presence of all neighboring access points only by searching for notification signals over a predetermined period without scanning all channels over the predetermined period.

(3) Since a notification signal includes information on a channel on which an access point operates, a communication terminal can detect the notification signal and then receive parameters of a network through a predetermined channel.

(4) A signal is not carelessly transmitted from a communication terminal in a frequency channel on which an access point does not operate, and thus, when another primary operation system is present, interference is not given thereto.

(5) A communication terminal that newly enters a network can ascertain the presence of an access point present around within a short time without transmitting a probe request.

(6) An access point can easily detect an increase in the number of access points present around only by receiving an operation channel thereof when data communication is not performed.

(7) A communication terminal can predict a channel and a timing on/at which a notification signal is transmitted in advance by receiving available channel information, a beacon transmission interval, and timing information as network parameters.

(8) By selecting either of ascending order and descending order with respect to frequency as a sequence pattern of sequentially switching frequency channels, it is possible to avoid complete coincidence of notification signal timings.

(9) It is possible to ascertain periodic notification signal transmission in a frequency channel by unifying only beacon intervals of access points.

(10) When access points operate fully asynchronously, operation channels can also be calculated from notification signals thereof.

(11) An access point receives a notification signal from a neighboring access point and reports parameters of the neighboring access point, and thus a communication terminal that attempts to newly enter a network can collect information of the neighboring access point within a shorter time.

(12) In a case where a notification signal from a neighboring access point has been received, since a timing of the periodically transmitted notification signal can be ascertained, it is possible to avoid the timing and perform data communication while avoiding a collision.

(13) When an aggregation data frame (A-MPDU) is configured, it is possible to avoid a collision between data transmission and a notification signal by inserting a null MPDU at a timing at which a notification signal is received in advance.

INDUSTRIAL APPLICABILITY

The technology disclosed in the present description has been described in detail above with reference to a specific embodiment. However, it will be apparent to those skilled in the art that modification and substation of the embodiment can be made without departing from the gist of the technology disclosed in the present description.

While the technology disclosed in the present description can be applied to wireless LAN systems that conform to the IEEE 802.11 standard, for example, the technology can also be applied to various types of wireless networks using multiple channels and equally realize stabilization of data transmission according to searching of an access point searching time and collision avoidance.

To sum up, the technology disclosed in the present description has been described according to an illustrative form, but the contents of the present description should not be restrictively construed. The gist of the technology disclosed in the present description should be determined in consideration of the claims.

Meanwhile, the technology disclosed in the present description may also be configured as follows.

(1) A communication device including:
a communication unit configured to transmit/receive a radio signal using available frequency channels; and
a control unit configured to control radio signal transmission/reception operations of the communication unit,
wherein the control unit controls data transmission and data reception operations in an operation channel selected from the available frequency channels, and an operation of switching channels at a predetermined cycle and sequentially transmitting a notification signal including information about the operation channel in the available frequency channels other than the operation channel.

(1-1) The communication device according to (1), wherein the notification signal includes information capable of identifying the operation channel.

(1-2) The communication device according to (1), wherein a channel that is not used by an existing primary operation system or a channel in which a signal from an overlapping BSS has been detected is set to an available frequency channel.

(2) The communication device according to (1), wherein the communication device transmits a beacon signal at a predetermined beacon interval on the operation channel to operate as an access point in a wireless network.

(3) The communication device according to (1) or (2), wherein the control unit sets channel switching for transmission of the notification signal to either of ascending order and descending order in a frequency direction.

(4) The communication device according to (2), wherein the control unit causes the notification signal to be transmitted at the same cycle as the beacon interval in the available frequency channels other than the operation channel.

(5) The communication device according to any one of (1) to (4), wherein the control unit causes the notification signal further including at least one of information about the available frequencies, information about a beacon interval, a direction in which channels through which the notification signal is transmitted are switched, and information about a neighboring access point, to be transmitted.

(6) The communication device according to any one of (1) to (5), wherein the communication unit receives a notification signal from another communication device through the operation channel, and
the control unit calculates a timing of the notification signal on the basis of information about an operation channel of the other communication device, information about the available frequency channels, and a beacon interval.

(7) The communication device according to any one of (1) to (6), wherein the control unit constructs information about a neighboring access point on the basis of the information about the operation channel of the other communication device.

(8) The communication device according to (6), wherein the control unit causes a data frame to be transmitted while avoiding a transmission timing of the notification signal of the other communication device in the operation channel.

(9) The communication device according to (8), wherein the control unit causes an aggregated data frame to be transmitted using the transmission timing of the notification signal of the other communication device as a buffering period.

(10) The communication device according to (8), wherein the control unit causes an aggregated data frame to be transmitted using a transmission timing of the notification signal of the communication device as a buffering period.

(10-1) The communication device according to (9) or (10), wherein a preamble of the aggregated data frame includes the buffering period or represents position information of the buffering period.

(11) A communication method including:
a data communication step of transmitting/receiving a data frame in an operation channel selected from available frequency channels; and
a notification step of switching channels at a predetermined cycle and sequentially transmitting a notification signal including information about the operation channel in the available frequency channels other than the operation channel.

(12) A communication device including;
a communication unit configured to transmit/receive a radio signal using available frequency channels; and
a control unit configured to control radio signal transmission/reception operations of the communication unit,
wherein the control unit selects at least one scan channel from the available frequencies, causes a reception operation to be performed over a predetermined cycle, and acquires information about an operation channel of another communication device that is a transmission source from a notification signal received through the scan channel.

(12-1) The communication device according to (12), wherein the control unit causes transmission or reception of a data frame to be performed in the operation channel of the other communication device.

(13) The communication device according to (12), wherein the control unit searches for access points of a wireless network on the basis of the notification signal received through the scan channel.

(14) The communication device according to (12) or (13), wherein the control unit causes communication with the other communication device operating as an access point to be performed to acquire information of the access point in the operation channel identified on the basis of the received notification signal.

(14-1) The communication device according to (14), wherein the control unit causes a beacon signal from the access point to be received in the operation channel identified on the basis of the received notification signal.

(14-2) The communication device according to (14) or (14-1), wherein the control unit causes a probe request to be transmitted to the access point and causes a probe response from the access to be received in the operation channel identified on the basis of the received notification signal.

(15) The communication device according to (13) or (14), wherein the control unit causes the communication device to enter a desired access point and operate as a communication terminal within the wireless network.

(16) The communication device according to (13), wherein the control unit acquires, as the information of the access point, at least one of information about the available frequencies, information about a beacon interval, a direction in which channels through which the notification signal is transmitted are switched, and information about a neighboring access point.

(16-1) The communication device according to (16), wherein the control unit acquires the information of the access point from a received notification signal or communication with the other communication device.

(17) The communication device according to any one of (12) to (16), wherein the control unit calculates a timing of a notification signal on the basis of the information about the operation channel of the other communication device, information about the available frequency channels, and a beacon interval.

(18) The communication device according to (17), wherein the control unit causes a data frame to be transmitted while avoiding a transmission timing of a notification signal of another communication device in the operation channel.

(19) The communication device according to (18), wherein the control unit causes an aggregated data frame to be transmitted using the transmission timing of the notification signal of the other communication device as a buffering period.

(20) A communication method including:
a step of selecting at least one scan channel from available frequencies and performing a reception operation over a predetermined cycle;
a step of acquiring information about an operation channel of a communication device that is a transmission source from a notification signal received through the scan channel; and
a step of performing transmission or reception of a data frame in the operation channel.

[Reference Signs List]

| | |
|---|---|
| 900 Communication device, | 901 Internet connection module |
| 902 Information input module, | 903 Device controller |
| 904 Information output module, | 905 Wireless communication module |
| 1001 Interface, | 1002 Transmission buffer |
| 1003 Network management unit, | 1004 Transmission frame construction unit |
| 1005 Reception data construction unit, | 1006 Reception buffer |
| 1007 Channel management unit, | 1008 Management information generation unit |
| 1009 Management information proccessing unit, | 1010 Notification signal transmission processing unit |
| 1011 Notification signal reception determination unit, | 1012 Wireless transmission processing unit |
| 1013 Transmission power control unit, | 1014 Transmission/reception antenna control unit |
| 1015 Detection threshold value control unit, | 1016 Wireless reception processing unit |

The invention claimed is:

1. A first communication device, comprising:
a communication unit configured to at least one of transmit or receive a radio signal via a plurality of available frequency channels; and a
control unit configured to:
control at least one of a radio signal transmission operation or a radio signal reception operation of the communication unit;
control at least one of a data transmission operation or a data reception operation in a first operation channel of the plurality of available frequency channels;
control an operation of channel switching among the plurality of available frequency channels at a specific cycle;
determine a first timing of a first notification signal based on the first operation channel, the plurality of available frequency channels, and a beacon interval;
sequentially transmit the first notification signal at the determined first timing, including first information associated with the first operation channel, in a first number of available frequency channels of the plurality of available frequency channels, wherein the first number of available frequency channels excludes the first operation channel;
set the channel switching among the plurality of available frequency channels; and
sequentially transmit the first notification signal in one of an ascending order or a descending order in a frequency direction, based on the channel switching.

2. The first communication device according to claim 1, wherein the communication unit is further configured to transmit a beacon signal at the beacon interval on the first operation channel to operate as an access point in a wireless network.

3. The first communication device according to claim 2, wherein the control unit is further configured to transmit the first notification signal at a cycle same as the beacon interval in the first number of available frequency channels.

4. The first communication device according to claim 2, wherein the first notification signal further includes at least one of second information associated with a plurality of available frequencies of the plurality of available frequency channels, third information associated with the beacon interval, a direction in which the first number of frequency channels are switched, or fourth information associated with a neighboring access point to the access point.

5. The first communication device according to claim 2, wherein
the control unit is further configured to construct second information associated with a neighboring access point to the access point based on third information, and
third information is associated with a second operation channel of a second communication device.

6. The first communication device according to claim 1, wherein
the communication unit is further configured to receive a second notification signal from a second communication device through the first operation channel, and
the control unit is further configured to calculate a second timing of the second notification signal based on at least one of second information associated with a second operation channel of the second communication device, third information associated with the plurality of available frequency channels, or the beacon interval.

7. The first communication device according to claim 6, wherein the control unit is further configured to transmit a data frame while avoiding the second timing of the second notification signal of the second communication device in the second operation channel.

8. The first communication device according to claim 7, wherein
the control unit is further configured to transmit an aggregated data frame at the second timing, of the second notification signal of the second communication device, as a buffering period.

9. The first communication device according to claim 7, wherein the control unit is further configured to transmit an aggregated data frame at the first timing, of the first notification signal of the first communication device, as a buffering period.

10. A communication method, comprising:
at least one of transmitting or receiving a data frame in an operation channel of a plurality of available frequency channels;
controlling an operation of channel switching among the plurality of available frequency channels at a specific cycle;
determining a timing of a notification signal based on the operation channel, the plurality of available frequency channels, and a beacon interval;
sequentially transmitting the notification signal at the determined timing, including information associated with the operation channel, in a first number of available frequency channels of the plurality of available frequency channels, wherein the first number of available frequency channels excludes the operation channel;
setting the channel switching among the plurality of available frequency channels; and
sequentially transmitting the notification signal in one of an ascending order or a descending order in a frequency direction, based on the channel switching.

\* \* \* \* \*